(12) United States Patent
Masumi et al.

(10) Patent No.: US 7,303,787 B2
(45) Date of Patent: Dec. 4, 2007

(54) ACTIVE RAY CURABLE INK-JET COMPOSITION, IMAGE FORMING METHOD USING THE SAME, AND INK-JET RECORDING APPARATUS

(75) Inventors: Satoshi Masumi, Odawara (JP); Daisuke Ishibashi, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 201 days.

(21) Appl. No.: 10/954,237

(22) Filed: Oct. 1, 2004

(65) Prior Publication Data

US 2005/0080153 A1  Apr. 14, 2005

(30) Foreign Application Priority Data

Oct. 6, 2003  (JP)  ............................ 2003-346683
Dec. 26, 2003  (JP)  ............................ 2003-432859

(51) Int. Cl.
*C09D 11/10* (2006.01)
*B05D 1/32* (2006.01)
*C08G 65/28* (2006.01)
*C08G 65/00* (2006.01)

(52) U.S. Cl. .................... 427/466; 522/71; 522/75; 522/81; 522/168; 522/170

(58) Field of Classification Search ............... 522/83, 522/168, 170, 71, 75, 81; 427/466
See application file for complete search history.

(56) References Cited

U.S. PATENT DOCUMENTS

| 5,889,084 | A * | 3/1999 | Roth ........................... 523/161 |
| 6,268,403 | B1 * | 7/2001 | Crivello ....................... 522/31 |
| 6,586,492 | B1 * | 7/2003 | Caiger et al. ................. 522/75 |
| 6,959,986 | B2 * | 11/2005 | Ushirogouchi et al. ..... 347/100 |

OTHER PUBLICATIONS

Abstract of JP 2005-187724, Patent Abstracts of Japan, Jul. 14, 2005.*

* cited by examiner

*Primary Examiner*—Susan Berman
(74) *Attorney, Agent, or Firm*—Finnegan, Henderson, Farabow, Garrett & Dunner, L.L.P.

(57) ABSTRACT

An active ray curable ink-jet ink composition comprising: (i) a colorant; and (ii) a set of (I) or a set of (II), wherein the set of (I) contains: (a) a photopolymerizable alicyclic epoxy compound; and (b) a diol compound contained in a specific amount; and the set of (II) contains: (a) a photopolymerizable oxetane compound; (b) a photopolymerizable epoxy compound; and (c) a diol compound contained in a specific amount.

21 Claims, 2 Drawing Sheets

ACTIVE RAY CURABLE INK-JET COMPOSITION, IMAGE FORMING METHOD USING THE SAME, AND INK-JET RECORDING APPARATUS

FIELD OF THE INVENTION

The present invention relates to an active ray curable ink-jet ink composition capable of recording a high-definition image onto every kind of recording material, an image forming method and an ink-jet recording apparatus both using the same.

BACKGROUND OF THE INVENTION

In recent years, ink-jet recording systems have been applied to various printing fields such as photography, various forms of printing, marking, and special printing such as color filters due to its capability of forming images simply and inexpensively. Specifically, it has become possible to achieve image quality comparable to that of silver salt photography, by employing recording apparatuses which eject minute dots under control, inks which exhibit an enhanced color reproduction range as well as enhanced durability, and improved ejection adaptability, and exclusive sheets which exhibit markedly improved ink absorbability, color forming properties of colorants and surface glossiness. Enhancement of image quality of the current ink-jet recording system is achievable only by simultaneous improvement of all the recording apparatuses, inks and exclusive sheets.

However, ink-jet systems, which require special recording sheets, result in problems such as limitations of recording media as well as a higher cost of the foregoing recording media. As a result, a number of experiments have been conducted in which recording is carried out on image receiving media differing from such exclusive sheets, while employing various ink-jet systems. Specific examples include a phase change ink-jet system using a wax based ink which is solid at room temperature, a solvent based ink-jet system using an ink comprised of rapid drying organic solvents as a main component, and a UV ink-jet system in which after image recording, crosslinking is carried out employing ultraviolet (UV light) radiation.

Of these, in recent years, the UV ink-jet system has received much attention due to its relatively low generation of unpleasant odors, rapid drying properties, and recording capability onto recording media exhibiting no ink absorbability. Ultraviolet radiation curing ink-jet inks are disclosed, for example, in Japanese Patent Publication No. 5-054667, Unexamined Japanese Patent Application Publication 6-200204, and Unexamined Japanese Patent Application Publication (under PCT Application) No. 2000-504778.

However, even though these inks are employed, it is very difficult to form high-definition images on each of the recording materials due to large differences of ink dot diameter after the ink deposition, depending on the type of recording materials and operation environment.

Specifically, UV radiation curable inks using a cationic polymerizable compound have been proposed (for, example, please refer to Patent Documents 1-4) in recent years, however, these UV radiation curable inks have drawbacks which tend to be affected by molecular level moisture (humidity), even exhibiting no oxygen inhibition action. Further, these inks have drawbacks of wrinkling generation by shrinkage during curing depending on curing conditions.

Image forming with a UV radiation curable ink jet method is characterized by having a capability of printing onto recording media exhibiting no ink absorbability. However, there are the specific drawbacks for this UV radiation curable ink jet method. For example, in the case of image formation onto a non-ink-absorbable recording medium, image quality deterioration due to mixture of deposited dots with neighboring dots is remarkable. Specifically, when a high quality image is needed, dot mixture among deposited different colors results in a big problem. Regarding above problems, proposed are active ray curable inks employing an oxirane compound, a vinyl ether compound or an oxetane compound as a photopolymerizable compound (for example, please refer Patent Documents 1 and 2). Further, also proposed are active ray curable inks employing alicyclic epoxy compounds and oxetane compounds as photopolymerizable compounds (for example, please refer to Patent Documents 3 and 4). However, with the methods proposed above, dot bleeding is not satisfactorily solved yet in the present situation.

In the case of the commonly used water based ink jet method, these problems have been solved by enhancing ink permeability into a recording medium using an exclusive sheet or additives having each of functions in inks. Under the present situation, in a UV radiation curable ink jet method, there is no solution for image formation onto a non-ink-absorbable recording medium. Further, in high speed printing, the materials printed an image thereon are usually wound up in to a roll. Therefore, development of an active ray curable ink-jet ink composition is specifically desired.

Patent Document 1: Unexamined Japanese Patent Publication (hereinafter, referred to as JP-A) 2001-220526 (in claims and examples)

Patent Document 2: JP-A 2002-188025 (in claims and examples)

Patent Document 3: JP-A 2002-317139 (in claims and examples)

Patent Document 4: JP-A 2003-55449 (in claims and examples).

SUMMARY OF THE INVENTION

From the viewpoint of the foregoing drawbacks, the present invention is offered. An object of the present invention is to provide an active ray curable ink-jet ink composition, an active ray curable ink-jet ink set, and an image forming method and an ink-jet recording apparatus both using the same, which are superior in high speed curability and easy handling, and are very stably capable of recording a high-definition image without color mixing.

The foregoing object of the present invention was achieved employing the embodiments described below.

Item 1. An active ray curable ink-jet ink composition comprising:

(i) a colorant; and (ii) a set of (I) or a set of (II), wherein the set of (I) contains:
(a) a photopolymerizable compounds represented by Formula (1):

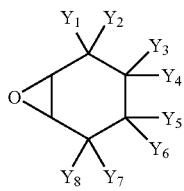

Formula (1)

wherein $Y_1$-$Y_8$ are each a hydrogen atom, a substituted or unsubstituted alkyl group, carbonyl group or ether group, which may be the same or different; and
(b) a diol compound represented by Formula (2), a contained amount of which being 0.1-10 weight % based on the total weight of the active ray curable ink-jet ink composition:

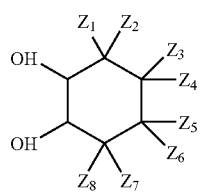

Formula (2)

wherein $Z_1$-$Z_8$ are each a hydrogen atom, a substituted or unsubstituted alkyl group, carbonyl group or ether group, which may be the same or different, and
the set of (II) contains:
(a) a photopolymerizable oxetane compound;
(b) a phoyopolymerizable compound represented by Formula (1a):

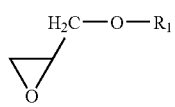

Formula (1a)

wherein $R_1$ is a substituted or unsubstituted alkyl group having 1-10 carbon atoms, aromatic group or acyl group; and
(c) a diol compound represented by Formula (2a), a contained amount of which being 0.1-10 weight % based on the total weight of the active ray curable ink-jet ink composition:

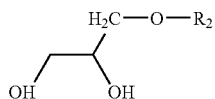

Formula (2a)

wherein $R_2$ is a substituted or unsubstituted alkyl group having 1-10 carbon atoms, aromatic group or acyl group.

Item 2. The active ray curable ink-jet ink composition according to item 1, wherein the diol compound represented by Formula (2a) is a compound obtained by chain opening of the photopolymerizable compound represented by Formula (1a).

Item 3. The active ray curable ink-jet ink composition according to item 1, wherein the diol compound represented by Formula (2) is a compound obtained by chain opening of the photopolymerizable compound represented by Formula (1).

Item 4. The active ray curable ink-jet ink composition according to item 1, wherein the photopolymerizable compound represented by Formula (1) is α-pinene oxide; and a diol compound is obtained by chain opening of an epoxy group of α-pinene oxide, an amount of which is 0.1-10 weight % based on the total weight of the active ray curable ink-jet ink composition.

Item 5. The active ray curable ink-jet ink composition according to item 1, wherein the photopolymerizable compound represented by Formula (1) is 1,2: 8,9 diepoxy limonene; and a diol compound is obtained by chain opening of the epoxy group of 1,2: 8,9 diepoxy limonene, an amount of which is 0.1-10 weight % based on the total weight of the active ray curable ink-jet ink composition.

Item 6. The active ray curable ink-jet ink composition according to any one of items 1, 3-6, wherein the set of (I) further contains a photopolymerizable oxetane compound.

Item 7. The active ray curable ink-jet ink composition according to any one of item 1-6, wherein the colorant is a pigment.

Item 8. The active ray curable ink-jet ink composition according to any one of item 1-6, wherein the colorant is an oil soluble dye.

Item 9. The active ray curable ink-jet ink composition according to any one of item 1-6, wherein a viscosity of the ink composition at 25° C. is 7-50 mPa·s.

Item 10. An ink-jet ink set comprising a plurality of the active ray curable ink-jet ink compositions according to item 7,
wherein each of the ink compositions contains a yellow pigment, a magenta pigment, a cyan pigment and a black pigment respectively.

Item 11. The ink-jet ink set comprising the plurality of the active ray curable ink-jet ink compositions according to item 8,
wherein each of the active ray curable ink-jet ink compositions contains an oil soluble yellow dye, an oil soluble magenta dye, an oil soluble cyan dye, and an oil soluble black dye respectively.

Item 12. The ink-jet ink set comprising the plurality of the active ray curable ink-jet ink compositions according to item 9,
wherein each of the active ray curable ink-jet ink compositions has a viscosity of 7-50 mPa·s.

Item 13. An image forming method using the ink-jet ink composition of items 1-9, comprising the steps of:
(a) ejecting a droplet of the ink composition from a nozzle of an ink-jet recording head to form an image onto a recording material; and
(b) irradiating the image with an active ray,
wherein the irradiation step is carried out between 0.001 and 1.0 second after deposition of the droplet of the ink composition.

Item 14. The image forming method according to item 13, wherein after irradiation step, a total thickness of the ink compositions on the recording material is 2-25 μm.

Item 15. The image forming method according to item 13, wherein a volume of the droplet of the ink composition ejected from the nozzle is 2-20 pl.

Item 16. The image forming method according to item 13, wherein the ink-jet recording head is a line head method ink-jet recording head.

Item 17. An ink-jet recording apparatus for forming an image using the active ray curable ink-jet ink set of item 10, wherein the active ray curable ink composition and the recording head are heated to 35-100° C. before ejecting step is carried out.

Item 18. The ink-jet recording apparatus for forming an image using the active ray curable ink-jet ink set of item 11, wherein the active ray curable ink composition and the recording head are heated to 35-100° C. before ejecting step is carried out.

Item 19. The ink-jet recording apparatus for forming an image using the active ray curable ink-jet ink set of item 12, wherein the active ray curable ink composition and the recording head are heated to 35-100° C. before ejecting step is carried out.

Item 20. An ink-jet recording apparatus for the image forming method of item 13, wherein the active ray curable ink composition and the recording head are heated to 35-100° C. before ejecting step is carried out.

Item 21. The ink-jet recording apparatus for the image forming method of item 14, wherein the active ray curable ink composition and the recording head are heated to 35-100° C. before ejecting step is carried out.

Item 22. The ink-jet recording apparatus for the image forming method of item 15, wherein the active ray curable ink composition and the recording head are heated to 35-100° C. before ejecting step is carried out.

Item 23. The ink-jet recording apparatus for the image forming method of item 16, wherein the active ray curable ink composition and the recording head are heated to 35-100° C. before ejecting step is carried out.

Based on the present invention, an object of this invention is to provide an active ray curable ink-jet ink composition exhibiting easy handling, high speed curability, no color mixing, and capability of stably reproducing a high-definition image, and an image forming method and an ink-jet recording apparatus both using the same.

DETAILED DESCRIPTION OF THE PREFERRED EMBODIMENT

Figure 1:
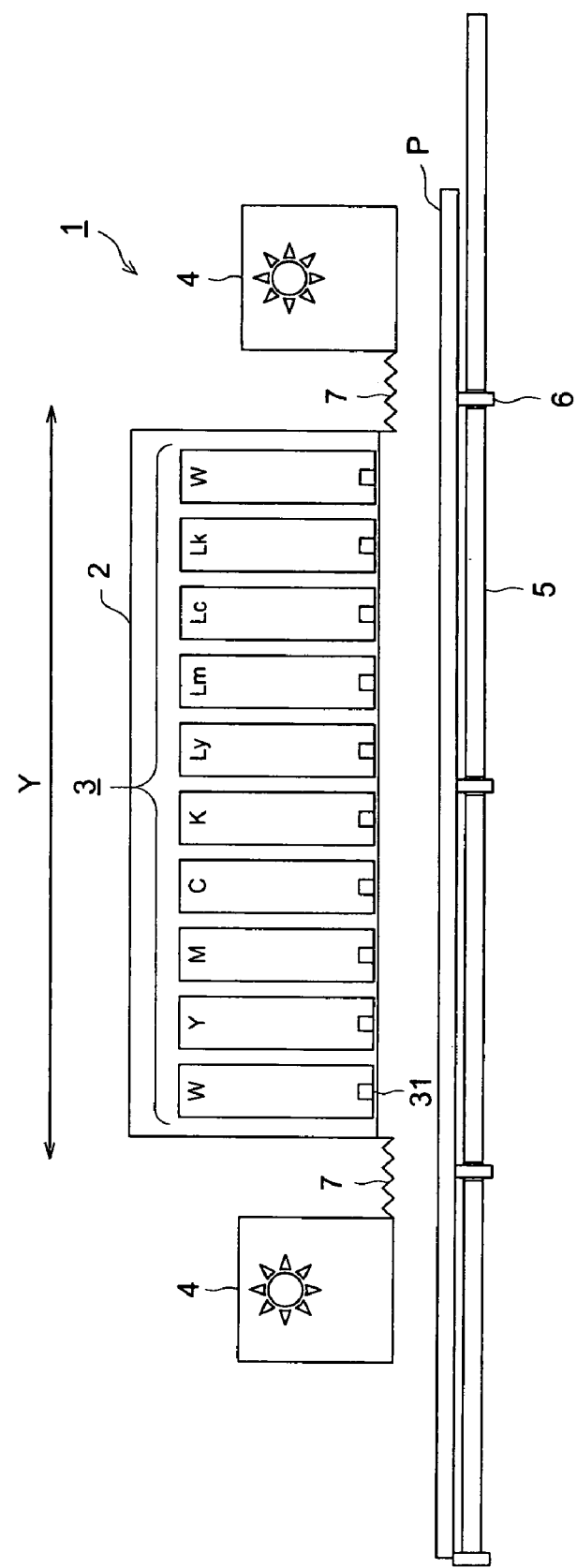
FIG. 1 is a front view showing an example of the constitution of substantial parts of an ink-jet recording apparatus employed in this invention.

The best mode to conduct this invention will be detailed below.

The inventors of the present invention found as a result of diligent study that in an active ray curable ink-jet ink composition comprising a colorant and a photopolymerizable compound, an active ray curable ink-jet ink composition which exhibited easy handling, high speed curability, no color mixing, and capability of stably reproducing a high-definition image, was obtained by the following compositions.

1) An active ray cyrable ink-jet ink composition comprises a photopolymerisable oxetane compound, a photopolymerizable compound represented by foregoing Formula (1a), and a diol compound represented by foregoing Formula 2a).

2) An active ray cyrable ink-jet ink composition comprises a photopolymerizable compound represented by foregoing Formula (1), and a diol compound represented by foregoing Formula (2) an amount of which is 0.1-10 weight % based on the total weight of the active ray curable ink-jet ink composition.

3) An active ray cyrable ink-jet ink composition comprises a photopolymerizable compound of α-pinene oxide, and a diol compound obtained by chain opening of an epoxy group of α-pinene oxide, an amount of which is 0.1-10 weight % based on the total weight of the active ray curable ink-jet ink composition.

4) An active ray curable ink-jet ink composition comprises a photopolymerizable compound of 1,2: 8,9 diepoxy limonene, and a diol compound obtained by chain opening of the epoxy group of 1,2: 8,9 diepoxy limonene, an amount of which is 0.1-10 weight % based on the total weight of the active ray curable ink-jet ink composition. Thus, inventors achieved the present invention.

The details of the present invention will be described below.

The oxetane compounds usable in the present invention refer to compounds having an oxetane ring. It is possible to employ any appropriate oxetane compound known in the art, such as those introduced in JP-A Nos. 2001-220526 and 2001-310937.

The compound having an epoxy group and represented by Formula (1a) will now be described. In Formula, $R_1$ is a substituted or unsubstituted alkyl group having 1-10 carbon atoms (such as methyl group, ethyl group, propyl group, butyl group, isopropyl group, t-butyl group, hexyl group, 2-ethylhexyl group and benzyl group), a substituted or unsubstituted aromatic group (such as a substituted or unsubstituted phenyl group or naphthyl group) or a substituted or unsubstituted acyl group (such as benzoyl group, methacryl group and stearyl group), and an alkyl group is preferred.

The added amount of the compound having an epoxy group is preferably 10-80 weight % to the total weight of the ink composition. When the content is less than 10 weight %, curability is remarkably decreased with curing conditions (such as temperature and humidity) resulting in being unusable. Further, when the content exceeds 80 weight %, layer physical characteristics after curing is brittle resulting in unusable. In the present invention, an alicyclic epoxy compound represented may be used alone or appropriately in combination of more than two kinds.

Further, manufacturing processes of these epoxy compounds may be indifferent, but these compounds may be easily synthesized using the following documents as reference, such as Jikken Kagaku Koza (meaning Course of Experimental Chemistry) $4^{th}$ edition, published by Maruzen Co., Ltd., 1992; Ed. by Alfred Hasfner, The Chemistry of heterocyclic compounds-Small Ring Heterocycles part 3 Oxiranes, John & Wiley and Sons, An Interscience Publication, New York, 1985; Yoshimura, Secchaku (meaning Adhesion) vol. 29, No. 12, pg 32, 1985; Yoshimura, Secchaku vol. 30, No. 5, pg 42, 1986; Yoshimura, Secchaku vol. 30, No. 7, pg 42, 1986; JP-A 11-100378; and Japanese Patent Nos. 2906275 and 2926262.

The compound having a diol group and represented by Formula (2a) will now be described. In the formula, $R_2$ is a substituted or unsubstituted alkyl group having 1-10 carbon atoms (such as substituted or unsubstituted methyl group, ethyl group, propyl group, butyl group, isopropyl group, t-butyl group, hexyl group, 2-ethylhexyl group and benzyl group), a substituted or unsubstituted aromatic group (such as a substituted or unsubstituted phenyl group or naphthyl group) or a substituted or unsubstituted acyl group (such as benzoyl group, methacryl group and stearyl group), and an alkyl group is preferred.

The added amount of the diol compounds is preferably 0.1-10 weight % based on the total weight of the ink composition of this invention and is more preferably 0.5-5 weight %. In cases when exceeding 10 weight %, curing rate is reduced. Further, while, when less than 0.1 weight %, an objected effect by addition of the diol compound is not obtained. The inventors presume that the diol compounds function as a chain transfer agents during curing reaction. Consequently, by addition of the diol compounds, an active site at a terminal of polymerization is regenerated, however, when the added amount is more than necessary, a molecular weight of obtained polymer results in being small to exhibit characteristics as same as that of substantially not cured one. Therefore, the necessary added amount is naturally determined.

The diol compounds of this invention can be obtained with synthesis methods well-known in the art. In this invention, preferred is the compound which is obtained by hydrolysis of the compound having the foregoing epoxy group, with acids. It is assumed that any diol compound may give a similar effect, and the diol compound obtained from the foregoing epoxy group exhibits good compatibility with the epoxy compound in the ink composition, resulting in sufficient curability, inhibition of bad effects by addition such as phase separation.

In an active ray curable ink-jet ink composition of the present invention (hereinafter, referred to also as an ink composition of this invention), one of characteristics is to use a compound having an alicyclic epoxy group represented by foregoing Formula (1) as a photopolymerizable compound.

The compound represented by Formula (1) of this invention will now be described.

In foregoing Formula (1), $Y_1$-$Y_8$ are each a hydrogen atom, an alkyl group having an unsubstituted or substituted group (such as methyl group, ethyl group, propyl group, butyl group, isopropyl group, t-butyl group, hexyl group, 2-ethylhexyl group, and benzyl group), a carbonyl group having an unsubstituted or substituted group (such as acetyl group and benzoyl group), or an ether group (such as alkyl ether group and aryl ether group), which may be the same or different.

Examples of the compounds having an epoxy group represented by foregoing Formula (1) are shown below, but the present invention is not limited to these examples.

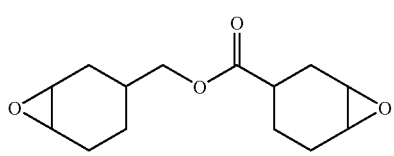

EP-1

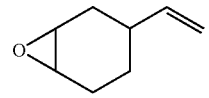

EP-2

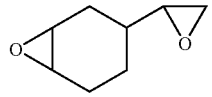

EP-3

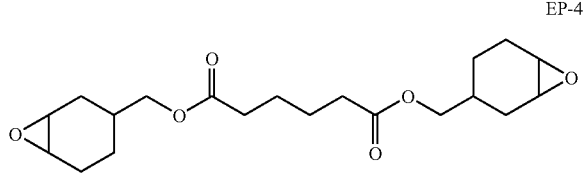

EP-4

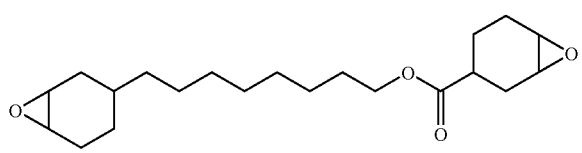

EP-5

The added amount of the compound having an epoxy group represented by above Formula (1) of this invention is preferably 10-80 weight % to the total weight of the ink composition of this invention. When the content is less than 10 weight %, curability is remarkably decreased with curing conditions (such as temperature and humidity) resulting in being unusable. Further, when the content exceeds 80 weight %, layer physical characteristics after curing is brittle resulting in unpracticed.

In the present invention, an alicyclic epoxy compound represented by foregoing Formula (1) of this invention may be used alone or appropriately in combination of more than two kinds. Further, manufacturing processes of these epoxy compounds may be indifferent, but these compounds may be easily synthesized using the following documents as reference, such as Jikken Kagaku Koza (meaning Course of Experimental Chemistry) 4th edition, published by Maruzen Co., Ltd., 1992; Ed. by Alfred Hasfner, The Chemistry of heterocyclic compounds-Small Ring Heterocycles part 3 Oxiranes, John & Wiley and Sons, An Interscience Publication, New York, 1985; Yoshimura, Secchaku (meaning Adhesion) vol. 29, No. 12, pg 32, 1985; Yoshimura, Secchaku vol. 30, No. 5, pg 42, 1986; Yoshimura, Secchaku vol. 30, No. 7, pg 42, 1986; JP-A 11-100378; and Japanese Registration Patent Nos. 2906275 and 2926262.

Subsequently, the compounds having a diol structure represented by foregoing Formula (2) of this invention will now be described.

In foregoing Formula (2), $Z_1$-$Z_8$ are each a hydrogen atom, an alkyl group having an unsubstituted or substituted group (such as methyl group, ethyl group, propyl group, butyl group, isopropyl group, t-butyl group, hexyl group, 2-ethylhexyl group, and benzyl group), a carbonyl group having an unsubstituted or substituted group (such as acetyl group and benzoyl group), or an ether group (such as alkyl ether group and aryl ether group), which may be the same or different.

The added amount of the diol compounds represented foregoing Formula (2) of this invention is 0.1-10 weight % based on the total weight of the ink composition of this invention, and is preferably 0.5-5 weight %. In cases when exceeding 10 weight %, curing rate is reduced. Further, when less than 0.1 weight %, an objected effect by addition of the diol compound is not obtained.

The inventors of this invention presume that the diol compounds represented by foregoing Formula (2) of this invention function as a chain transfer agents during curing reaction. Consequently, by addition of the diol compounds, an active site at a terminal of polymerization is regenerated, however, when the added amount is more than necessary, a molecular weight of obtained polymer results in being small to exhibit characteristics as same as that of substantially not cured one. Therefore, the necessary added amount is naturally determined.

The diol compounds represented by foregoing Formula (2) of this invention can be obtained with synthesis methods well-known in the art. In this invention, preferred are the compounds which are obtained by hydrolysis (being ring opening) of the compounds having an alicyclic epoxy group, represented by foregoing Formula (1), with acids. It is assumed that any diol compound may give a similar effect, however, the diol compounds obtained from the alicyclic epoxy group represented by foregoing Formula (1) exhibit compatibility with the alicyclic epoxy compounds represented by foregoing Formula (1) in the ink composition, resulting in sufficient curability, inhibition of bad effects by addition such as phase separation, and enhancement of stability of the ink composition.

Examples of the compounds having a diol group, represented by Formula (2) of this invention, are shown below, but the present invention is not limited to these samples.

DI-1
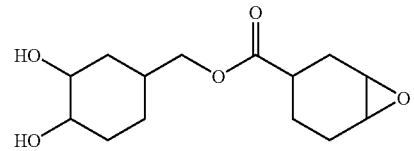

DI-2
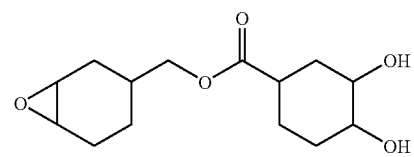

DI-3
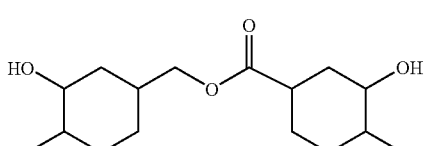

DI-4
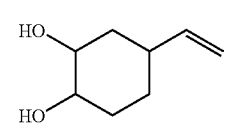

DI-5
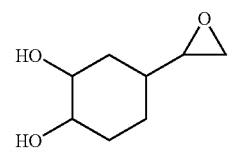

-continued

DI-6
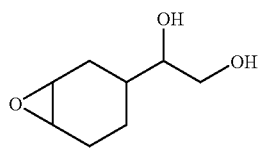

DI-7
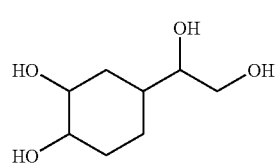

DI-9
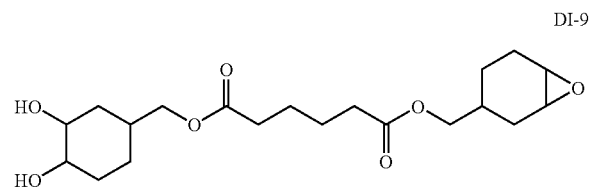

DI-10
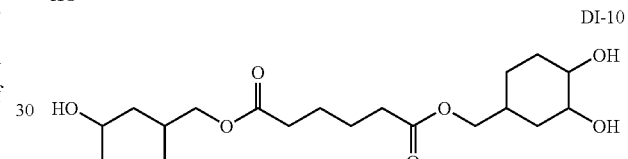

DI-11

DI-12
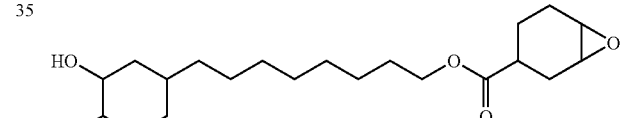

DI-13
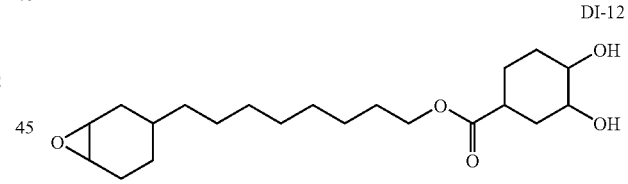

DI-13
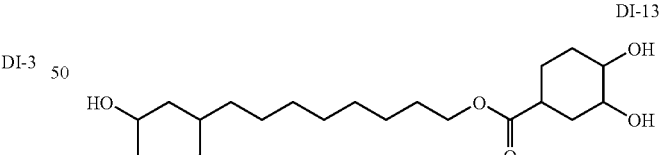

DI-14
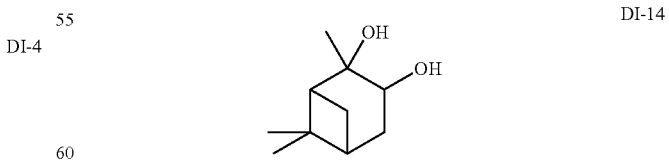

DI-15
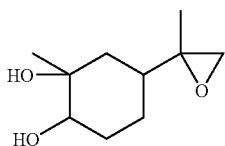

-continued

DI-16

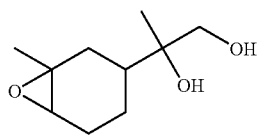

DI-17

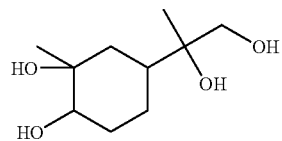

Further, in the ink composition of this invention, α-pinene oxide being an epoxy compound is employed as a photopolymerizable compound, and further, the compound having a diol structure, which is obtained by ring opening of an epoxy group of α-pinene oxide, is contained in the amount of 0.1-10 weight % based on the total weight of the active ray curable ink-jet ink composition.

Further, in the ink composition of this invention, 1,2: 8,9 diepoxy limonene of an apoxy compound is employed, and further, the compound having a diol structure, which is obtained by ring opening of an epoxy group of 1,2: 8,9 diepoxy limonene, is contained in the amount of 0.1-10 weight % based on the total weight of the active ray curable ink-jet ink composition.

As same as the effects of the combination of the alicyclic epoxy compound represented by foregoing Formula (1) and the diol compound which are obtained by hydrolysis (being ring opening) of the compounds having an alicyclic epoxy group, represented by foregoing Formula (1), with acids, either combination described above may give similar effects, namely, compatibility with the epoxy compounds and its ring opened diol compound in the ink composition, resulting in sufficient curability, inhibition of bad effects by addition such as phase separation, and enhancement of stability of the ink composition.

In the ink composition of this invention, it is preferred to contain a compound having an oxetane ring together with each of above epoxy compounds.

Further, in the ink composition of this invention, the combination of a monofunctional oxetane compound containing one oxetane ring, and a multifunctional oxetane compound containing more than two oxetane rings, is more preferable to enhance film hardness and adhesion to a recording material after curing. However, when using a compound incorporating more than five oxetane rings, viscosity of the ink composition becomes excessive, resulting in difficulty in handling, and further, glass-transition temperature of the ink composition becomes excessive, resulting in insufficient adhesion of the cured material. The oxetane ring incorporating compound usable in this invention is preferably a compound containing 1-4 oxetane rings.

Specific examples of compounds having oxetane ring(s) according to the present invention will now be described. However, the present invention is not limited thereto.

Listed as examples of compounds having one oxetane ring are those represented by Formula (I) described below.

Formula (I)

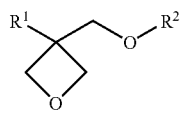

In Formula (I), $R^1$ is a hydrogen atom, an alkyl group having 1-6 carbon atoms such as a methyl group, an ethyl group, a propyl group, or a butyl group, a fluoroalkyl group having 1-6 carbon atoms, an allyl group, an aryl group, a furyl group, or a thienyl group, while $R^2$ represents an alkyl group having 1-6 carbon atoms such as a methyl group, an ethyl group, a propyl group, or a butyl group, an alkenyl group having 2-6 carbon atoms such as a 1-propenyl group, a 2-propenyl group, a 2-methyl-1-propenyl group, a 2-methyl-2-propenyl group, a lutenyl group, a 2-butenyl group, or a 3-butenyl group, a group having an aromatic ring such as a phenyl group, a benzyl group, a fluorobenzyl group, a methoxybenzyl group, or a phenoxyethyl group, an alkylcarbonyl group having 2-6 carbon atoms such as an ethylcarbonyl group, a propylcarbonyl group, or a butylcarbonyl group, an alkoxycarbonyl group having 2-6 carbon atoms such as an ethoxycarbonyl group, a propoxycarbonyl group, or a butoxycarbonyl group, or an N-alkylcarbamoyl group having 2-6 carbon atoms such as an ethylcarbamoyl group, a propylcarbamoyl group, a butylcarbamoyl group, or a pentylcarbamoyl group. Specifically preferably employed as oxetane compounds used in the present invention are compounds having one oxetane ring, because the resulting composition exhibits excellent adhesion property and also excellent workability due to its lower viscosity.

Listed as examples of compounds having two oxetane rings are those represented by Formula (II) described below.

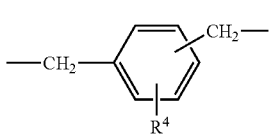

In Formula (II), $R^1$ is the same groups as those in foregoing Formula (I), while $R^2$ is, for example, a straight or branched alkylene group such as an ethylene group, a propylene group, or a butylenes group, a straight or branched poly(alkyleneoxy) group such as a poly(ethyleneoxy) group or a poly(propyleneoxy) group, a straight or branched unsaturated hydrocarbon group such as a propenylene group, a methylpropenylene group, or a butenylene group, an alkylene group comprising a carbonyl group, an alkylene group comprising a carbonyl group, an alkylene group comprising a carbonyl group; an alkylene group comprising a carboxyl group, or an alkylene group comprising a carbamoyl group.

Further, $R^3$ is a multivalent group selected from groups represented by General Formulas (III), (IV), and (V) described below.

Formula (III)

—CH$_2$—⟨aromatic ring with $R^4$⟩—CH$_2$—

In Formula (III), $R^4$ is a hydrogen atom or an alkyl group having 1-4 carbon atoms such as a methyl group, an ethyl group, a propyl group, or a butyl group, an alkoxy group having 1-4 carbon atoms such as a methoxy group, an ethoxy group, a propoxy group, or a butoxy group, a halogen atom such as a chlorine atom or a bromine atom, a nitro group, a cyano group, a mercapto group, a lower alkylcarboxyl group, or a carbamoyl group.

Formula (IV)

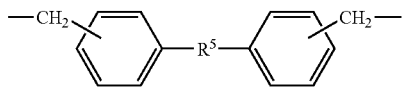

In Formula (IV), $R^5$ is an oxygen atom, a sulfur atom, a methylene group, NH, SO, $SO_2$, $C(CF_3)_2$, or $C(CH_3)_2$.

Formula (V)

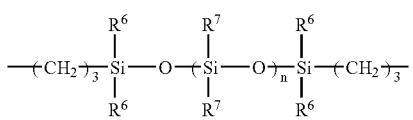

In Formula (V), $R^6$ is an alkyl group having 1-4 carbon atoms such as a methyl group, an ethyl group, a propyl group, or a butyl group, or an aryl group; n represents an integer of 0-2,000; $R^7$ represents an alkyl group having 1-4 carbon atoms such as a methyl group, an ethyl group, a propyl group, or a butyl group, or an aryl group; and $R^7$ also represents a group selected from the groups represented by Formula (VI) described below.

Formula (VI)

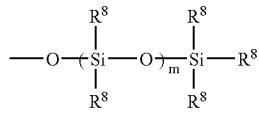

In Formula (VI), $R^8$ is an alkyl group having 1-4 carbon atoms such as a methyl group, an ethyl group, a propyl group, or a butyl group, or an aryl group, and m represents an integer of 0-100.

Listed as specific examples of compounds having two oxetane rings are the compounds described below.

Exemplified Compound 1

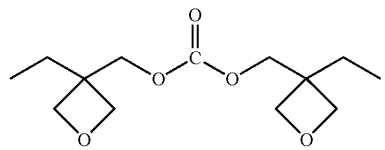

Exemplified Compound 2

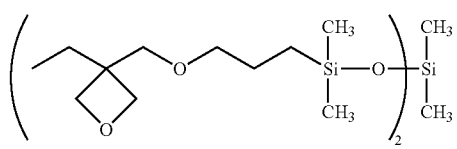

Exemplified Compound 1 is the compound in which in foregoing Formula (II), $R^1$ is an ethyl group, while $R^3$ is a carboxyl group. Further, Exemplified Compound 2 is the compound in which in foregoing Formula (II), $R^1$ is an ethyl group, in foregoing Formula (V), $R^3$ is $R^6$, $R^7$ is a methyl group, and n is 1.

Of compounds having two oxetane rings, examples of preferred compounds, other than those described above, include compounds represented by Formula (VII) described below. In Formula (VII), $R^1$ is as defined in foregoing Formula (I) for $R^1$.

Formula (VII)

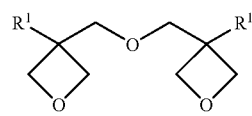

Further, listed as examples of compounds having 3-4 oxetane rings are the compounds represented by Formula (VIII) described below.

Formula (VIII)

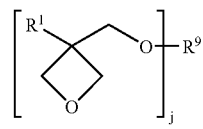

In Formula (VIII), $R^1$ is as defined in foregoing Formula (I) for $R^1$, $R^9$ is, for example, a branched alkylene group having 1-12 carbon atoms such as the groups represented by A-C described below, a branched poly(alkyleneoxy) group such as the groups represented by D described below, or a branched polysiloxy group such as the groups represented by E described below, and j is 3 or 4.

A

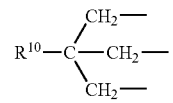

B

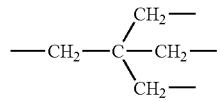

C

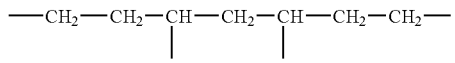

D

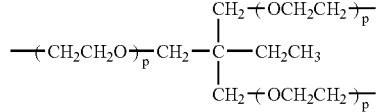

E

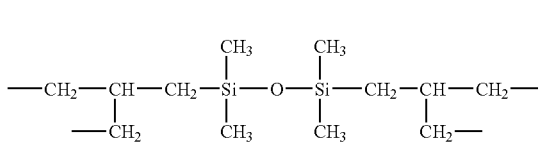

In foregoing A, $R^{10}$ is a lower alkyl group such as a methyl group, an ethyl group, or a propyl group. Further, in foregoing D, p is an integer of 1-10.

Listed as one example of a compound having 3-4 oxetane rings is Exemplified Compound 3.

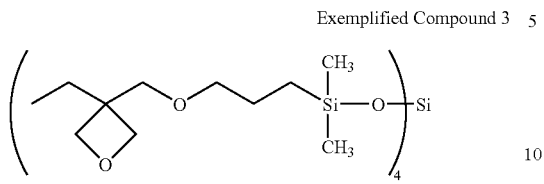
Exemplified Compound 3

Further, listed as examples of compounds having 1-4 oxetane rings are compounds represented by Formula (IX) described below.

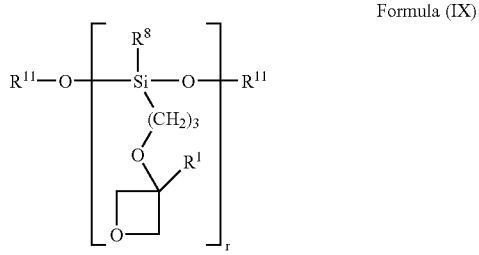
Formula (IX)

In Formula (IX), $R^8$ is as defined in foregoing Formula (VI) for $R^8$, $R_{11}$ is an alkyl group having 1-4 carbon atoms such as a methyl group, an ethyl group, a propyl group, or a butyl group, or a trialkylsilyl group, and r is 1-4.

Specific examples of oxetane compounds preferably employed in the present invention include the compounds described below.

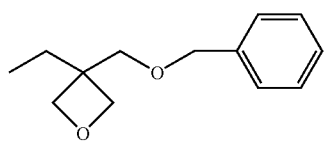
Exemplified Compound 4

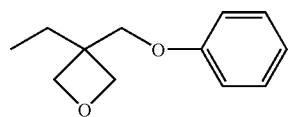
Exemplified Compound 5

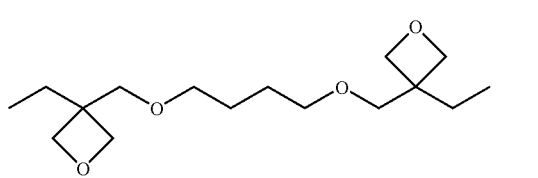
Exemplified Compound 6

Production methods of each compound having oxetane ring(s) described above are not particularly limited and any conventionally known methods may be employed. For example, an oxetane ring synthesis method, which employs diols as a raw material, is known which is disclosed in D. B. Pattison, J. Am. Chem. Soc., 3455, 79 (1957)). Further, other than these, listed are compounds, having 1-4 oxetane rings, which have a high molecular weight such as 1,000-5,000. Listed as specific examples of these compounds are the compounds described below.

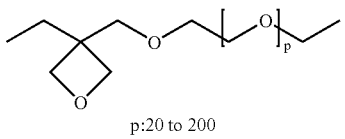
Exemplified Compound 7 p:20 to 200

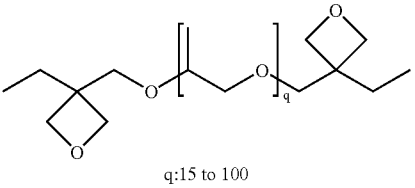
Exemplified Compound 8 q:15 to 100

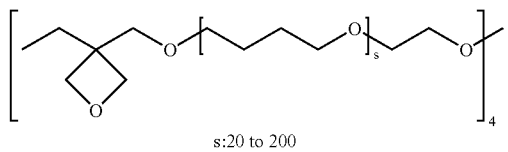
Exemplified Compound 9 s:20 to 200

In order to achieve ejection stability as well as desired curability, irrespective of the curing ambience (temperature and humidity), the viscosity of the ink composition of the present invention is preferably 7-50 mPa·s at 25° C.

The ink composition of this invention preferably contains various well known pigments as colorants. Pigments preferably employed in this invention are listed below.

C. I. Pigment Yellow: 1, 2, 3, 12, 13, 14, 16, 17, 73, 74, 75, 81, 83, 87, 93, 95, 97, 98, 109, 114, 120, 128, 129, 138, 151 and 154

C.I. Pigment Red: 5, 7, 12, 22, 38, 48: 1, 48: 2, 48: 4, 49: 1, 53: 1, 57: 1, 63: 1, 101, 112, 122, 123, 144, 146, 168, 184, 185 and 202

C.I. Pigment Violet: 19 and 23

C.I. Pigment Blue: 1, 2, 3, 15: 1, 15: 2, 15: 3, 15 4, 18, 22, 27, 29, and 60

C.I. Pigment Green: 7 and 36

C.I. Pigment White: 6, 18, and 21

C.I. Pigment Black: 7

Further, employable as carbon black pigment are;
No. 2300, No. 900, MCF-88, No. 33, No. 40, No. 45, No. 52, MA7, MA8, MA100, and No. 2200B, all produced by Mitsubishi Chemical Corp.

Raven 700, Raven 5750, Raven 5250, Raven 5000, Raven 3500, Raven 1255, all produced by Columbia Corp.

Regal 400R, Regal 330R, Regal 660R, Mogul L, Monarch 700, Monarch 800, Monarch 880, Monarch 900, Monarch 1000, Monarch 1100, Monarch 1300, and Monarch 1400, all produced by Cabot Corp.

Color Black FW1, Color Black FW2, Color Black FW2V, Color Black Fw18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4, all produced by Degussa AG.

Max Sorb G-40, Max Sorb G-15, and Max Sorb G-08, all produced by Kansai Color And Chemicals Co., Ltd.

Further, in the present invention, in order to enhance covering power of color on transparent substrates such as plastic film, it is preferable to use a white ink. Specifically, in soft package printing and label printing, it is preferable to use a white ink. However, since the ejection amount needs to be increased, from the viewpoint of the foregoing ejection stability, and the likelihood of curling and wrinkling, the used amount needs to be limited.

The above pigments may be dispersed employing, for example, a ball mill, a sand mill, an attritor, a roller mill, an agitator, a Henschel mixer, a colloid mill, an ultrasonic homogenizer, a pearl mill, a wet type jet mill, or a paint shaker. Further, during dispersion of pigments, it is possible to add dispersing agents. Preferably employed as dispersing agents are polymer dispersing agents. Listed as polymer dispersing agents are any of the Solsperse-series available from Avecia Ltd. and any of the AJISPER PB-series available from Ajinomoto-Fine-Techno Co., Inc. Further, employed as-dispersing aids may be synergists corresponding to each of the various types of pigments. The added amount of the aforesaid dispersing agents and dispersing aids is preferably 1-50 parts by weight with respect to 100 parts by weight of the pigments. Dispersion media are to be comprised of solvents or polymerizable compounds. In the radiation curable type ink employed in the present invention, in order to allow the aforesaid ink to undergo reaction and curing immediately after ink deposition, it is preferable to avoid solvents. When solvents remain in cured images, solvent resistance is degraded and VOC problems of remaining solvents also result. Therefore, it is preferable that in the dispersion media, polymerizable compounds are prefered instead of solvents. Of polymerizable compounds, from the viewpoint of appropriate dispersion, it is preferable to select monomers of the lowest viscosity.

Pigments are preferably dispersed to result in an average particle diameter of 0.08-0.5 µm. Suitable pigments, dispersing agents, dispersion media, dispersing conditions and filtering conditions are optionally selected and set so that the maximum particle diameter is controlled to be in the range of 0.3-10 µm and preferably 0.3-3 µm. By the foregoing particle diameter management, it is possible to minimize clogging of head nozzles, as well as to maintain storage stability of the ink, ink transparency and curing rate. Concentration of pigments in the photocurable ink of the present invention is preferably 1-10 weight % based on the total ink composition.

In the ink composition of the present invention, it is preferable to employ various well-known dyes as colorants.

Preferably employable dyes in this invention are listed below.

Various dyes such as an azo dye, an azomethine dye, a quinone dye, a phthalocyanine dye and a methane dye are employable as dyes.

C. I. Solvent Yellow: 1, 2, 3, 4, 14, 16, 19, 29, 56, 79, 82, 83 and 88

C. I. Solvent Red: 1, 18, 24, 27, 43, 51, 72, 73, 84, 132 and 218

C. I. Solvent Violet: 3

C. I. Solvent Blue: 1, 2, 11, 35, 40, 44, 67 and 70

C. I. Solvent Green: 3

C. I. Solvent Black: 3, 7, 22, 27, 29, 34, 43 and 70

C. I. Disperse Yellow: 5, 42, 54, 64, 79, 82, 93, 99, 199, 119, 122, 124, 126, 160, 184: 1, 186, 198, 199, 204, 224 and 237

C. I. Disperse Orange: 13, 29, 31: 1, 33, 49, 54, 55, 66, 73, 118, 119 and 163

C. I. Disperse Red: 54, 60, 72, 73, 86, 88, 91, 92, 03, 111, 126, 127, 134, 143, 145, 152, 153, 154, 159, 164, 167: 1, 177, 181, 204, 206, 207, 221, 239, 240, 258, 277, 278, 283, 311, 323, 343, 348, 356 and 362

C. I. Disperse Violet: 33

C. I. Disperse Blue: 56, 60, 73, 87, 113, 128, 143, 148, 154, 158, 165, 165: 1, 165: 2, 176, 183, 185, 197, 198, 201, 214, 224, 225, 257, 266, 267, 287, 354, 358, 365 and 368

C. I. Disperse Green: 6:1 and 9 Further, addition to the above oil soluble dyes, employable are;

Valifast Yellow 4120, Varifast Yellow 3150, Varifast Yellow 3108, Varifast Yellow 2310N, Valifast Yellow 1101, Varifast Red 3320, Varifast Red 3304, Varifast Red 1306, Varifast Blue 2610, Varifast Blue 2606, Varifast Blue 1603, Oil yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906 and Oil Black 5905, all produced by Orient Chemical Co., Ltd.

Kayaset Yellow SF-G, Kayaset Yellow K-CL, Kayaset Yellow GN, Kayaset Yellow A-G, Kayaset Yellow 2G, Kayaset Red SF-4G, kayast Red K-BL, Kayaset Red A-BR, Kayaset Magenta 312 and Kayaset Blue K-FL, all produced by Nippon Kayaku Co., Ltd.

FS Yellow 1015, FS Magenta 1404, FS Cyan 1522 and FS Blue 1504, produced by Arimoto Chemical Co., Ltd.

In the ink composition of this invention, the content of the above oil soluble dyes is preferably 1-15 weight % based on the total ink component.

Other than those described above, employed in the active ray curable ink of the present invention may be various additives. Listed, for example, are surface active agents, leveling additives, matting agents, polyester based resins, polyurethane based resins, vinyl based resins, acrylic based resins, rubber based resins, and waxes to adjust physical properties of the layers. Further, for the purpose of improving storage stability, it is possible to employ any of the effective basic compounds known in the art. Listed as representative compounds are basic alkali metal compounds, basic alkaline earth metal compounds, and basic organic compounds such as amines. Further it is possible to prepare a radical.cationic hybrid type curable ink by combining radically polymerizable monomers with initiators.

Basic compounds may also be preferably combined. Containing a basic compound may not only enhance ejection stability, but also inhibit wrinkling generation by shrinkage during curing under low humidity. As a basic compound, any well-known appropriate compound may be used, but typical examples include a basic alkali metal compound, a basic alkaline earth metal compound, and basic organic compounds such as amines.

As above basic alkali metal compounds, listed are a hydroxide of alkali metals (such as lithium hydroxide, sodium hydroxide and potassium hydroxide), a carbonate of alkali metals (such as lithium carbonate, sodium carbonate and potassium carbonate), and an alcholate of alkali metals (such as sodium methoxide, sodium ethoxide, potassium methoxide and potassium ethoxide).

As basic alkaline earth metal compounds, listed are a hydroxide of alkaline earth metals (such as magnesium hydroxide and calcium hydroxide), a carbonate of an alkaline earth metal (such as magnesium carbonate and calcium carbonate), and an alcholate of an alkaline earth metal (such as magnesium methoxide).

As basic organic compounds, listed are nitrogen containing heterocyclic compounds such as an amine, a quinoline and a quinolizine. Of these, amine is preferable from the viewpoint of compatibility with a photo polymerizable monomer, for example, octylamine, naphthylamine, xylenediamine, dibenzylamine, diphenylamine, dibutylamine, trioctylamine, tetramethylethylenediamine, tetramethyl-1,6-hexamethylenediamine, hexamethylenetetramine, and triethanolamine.

The concentration, when a basic compound exists, is preferably 10-1,000 ppm by weight based on the total weight of the photo polymerizable monomer, and specifically preferable in the range of 20-500 ppm. These basic compounds may be used alone or in combinations of a plurality of them.

Further, in order to inhibit ink curing in ink tanks, piping and ink heads, water may be added. The added amount of water is preferably 0.1-8 weight % based on the total ink component.

In the ink composition of this invention, any well-known photo-induced acid generating agent may be employed.

As photo-induced acid generating agents, used are, for example, the compounds which are employed in chemical amplification type photoresists and cation photopolymerization [please, refer to "Imaging you Yuki Zairyo (Organic Materials for Imaging)", edited by Yuki Electronics Zairyo Kenkyu Kai, published by Bunshin Shuppan (1993), pages 187-192]. Examples of compounds suitable for the present invention are listed below.

Initially, it is possible to list $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium and phosphonium.

Specific examples of onium compounds, which can be employed in the present invention, are listed below.

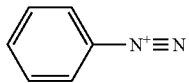
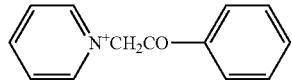

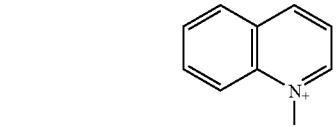

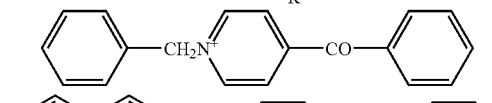

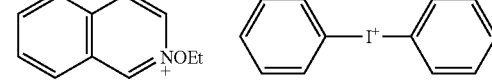

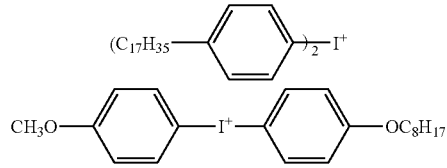

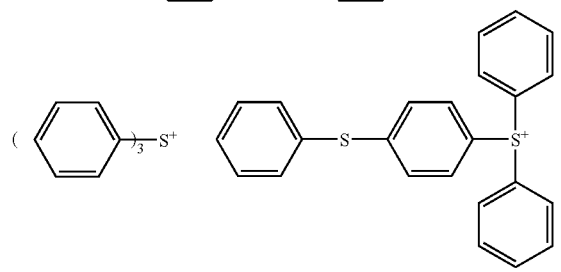

-continued

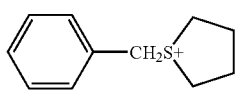
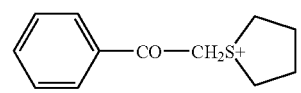

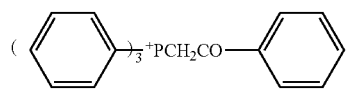

Secondly, it is possible to list sulfonate compounds which generate sulfonic acid. Specific compounds are illustrated below.

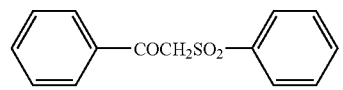

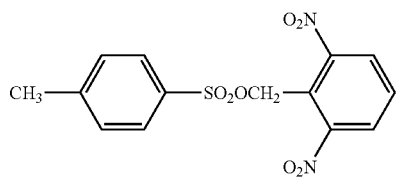

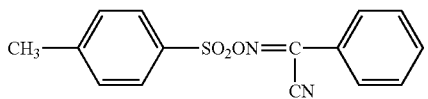

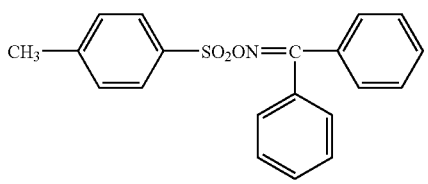

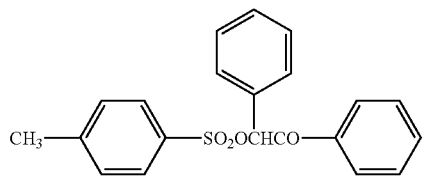

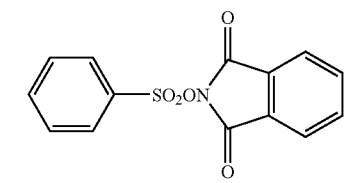

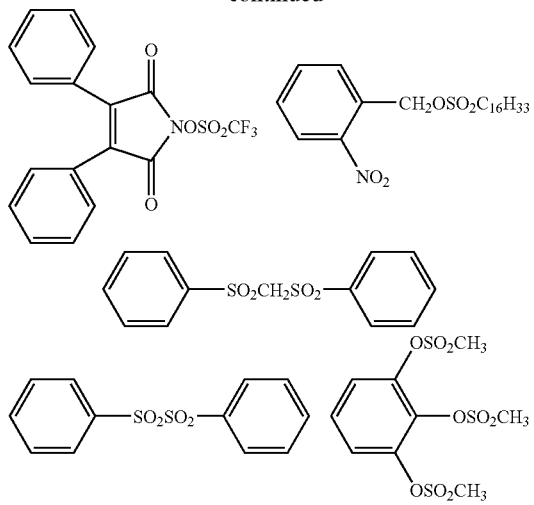

Thirdly, it is possible to employ halides which photolytically generate hydrogen halide. The specific compounds are exemplified below.

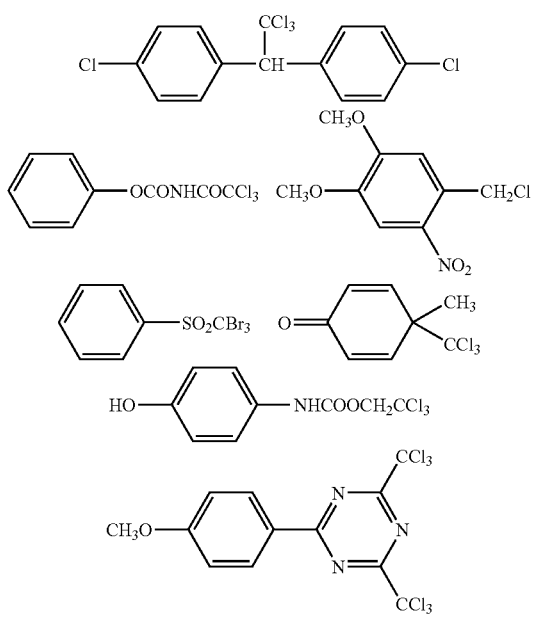

Fourthly, it is possible to employ iron arene complexes as exemplified below.

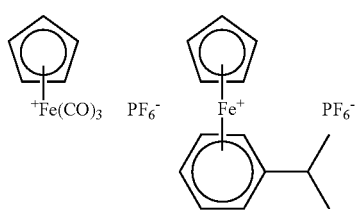

Other than common uncoated paper and coated paper, usable as recording materials in the present invention may be various types of non-absorptive plastics, and films thereof, which are employed in so-called soft packaging. Examples of various types of plastic films include polyethylene terephthalate (PET) film, oriented polystyrene (OPS) film, oriented polypropylene (OPP) film, oriented nylon (ONy) film, polyvinyl chloride (PVC) film, polyethylene (PE) film, and triacetyl cellulose (TAC) film. Employed as other plastics may be polycarbonates, acryl resins, ABSs, polyacetals, PVAs, and rubber materials. Further, metals and glass may also be employed. Of these recording materials, when images are formed, specifically on a PET film, an OPS film, an OPP film, an ONy film, or a PVC film all of which are thermally shrinkable, the effects of the embodiments of the present invention is more pronounced. These substrates tend to result in curling and deformation of the film due to shrinkage during ink curing and heat generated during the curing reaction. In addition, it is difficult for the ink layer to follow shrinkage of the foregoing substrate.

The surface energy of these various plastic films differs greatly. As a result, heretofore, problems have occurred in which dot diameter varies after ink deposition, depending largely on the recording materials. However, in the embodiment of the present invention, it is possible to form high-definition images on the recording materials having a surface energy ranging from 35-60 mN/m, including an OPP film as well as an OPS film having a relatively low surface energy and a PET film having a relatively high surface energy.

In the present invention, from the viewpoint of the cost of recording materials such as packaging cost as well as production cost, print production efficiency, and compatibility with various size prints, it is more advantageous to used rolled (web) recording materials.

The active ray curable ink-jet ink set of this invention comprises an active ray curable ink-jet ink composition of yellow, an active ray curable ink-jet ink composition and an active ray curable ink-jet ink composition of cyan, and all of the active ray curable ink-jet ink compositions are each the active ray curable ink-jet ink compositions of the present invention. In the case of forming an ink-jet image using the active ray curable ink-jet ink set of the present invention, it is possible to obtain an image in which color mixing problem is solved.

Further, to form an image using an ink-jet system, so-called dark and light inks which are prepared to adjust colorant contents in representative inks, can be employed. Further, if needed, it is preferable to employ special inks of red, green, blue and white from the viewpoint of color reproduction.

Next, the image forming method of this invention will be described.

In the image forming method of the present invention, a method is preferred in which the foregoing ink is ejected onto a recording material to form images, employing an ink-jet recording system, and subsequently the resulting ink is cured while exposed to active radiation, such as ultraviolet radiation.

Total Ink Layer Thickness after Ink Deposition

In the present invention, the total ink layer thickness after curing, when ink is deposited on the recording material and exposed to active ray radiation, is preferably 2-25 µm. In the active ray curable ink-jet recording of the screen-printing field, currently the total ink layer thickness exceeds 25 µm. However, in the soft package printing field, in which recording materials are comprised of relatively thin plastic materials, excessive ink ejection, which results in a thick ink layer, is not preferred because problems occur in which stiffness as well as the feel of quality of the entire printed materials varies, in addition to the foregoing problems of curling and wrinkling of recording materials.

Further, "total ink layer thickness", as described herein, refers to the maximum ink layer thickness of all images formed on a recording material. The foregoing total layer thickness is applied in the same manner, even though 2-color overprinting (secondary color), 3-color overprinting, or 4-color overprinting (with a white ink base) is carried out employing ink-jet recording systems.

Ink Ejection Condition

Preferred ink ejection conditions are such that a recording head and the ejected ink are heated at 35-100° C. and ejection is performed to achieve ejection stability. The viscosity of the active ray curable ink varies widely depending on the temperature. The resulting viscosity variation results in major effects to the liquid droplet size, as well as the liquid droplet ejection rate, which degrade image quality. As a result, it is necessary to maintain temperature at a constant value. The controlled temperature range of ink temperature is preferably the set temperature ±5° C., more preferably the set temperature ±2° C., and still more preferably the set temperature ±1° C.

Further, in the present invention, the volume of droplets ejected from each nozzle is preferably 2-20 pl. In order to form high-definition images, it is necessary to maintain the volume of a droplet in the foregoing range. However, when the foregoing droplet volume is ejected, it becomes more difficult to achieve the foregoing ejection stability. In the present invention, even though ejection is carried out at a small droplet volume of 2-20 pl, ejection stability is enhanced, whereby it is possible to consistently form high-definition images.

Radiation Condition after Ink Deposition

In the image forming method of the present invention, exposure to active rays is preferably 0.001-1.0 seconds after ink deposition and more preferably 0.001-0.5 seconds. In order to form high-definition images, it is particularly critical that exposure timing is initiated as soon as possible.

A basic method for active ray exposure is disclosed in JP-A 60-132767. According to the foregoing patent, light sources are arranged on both sides of a head unit and foregoing head and light sources are subjected to scanning, employing a shuttle system. Exposure is to be carried out at a specific time after ink deposition. Further, curing is completed employing another light source which is not driven. U.S. Pat. No. 6,145,979 discloses exposure methods in which optical fibers are employed and UV radiation is exposed to a recording section while collimated UV radiation is incident to a mirror surface provided on a side of the head unit surface. In the image forming method of the present invention, any of these exposure methods are effective.

Further, a preferred embodiment includes a method in which 2-step active ray exposure is carried out in such a manner that first active radiation is exposed 0.001-2.0 seconds after ink deposition and after completion of printing, active radiation is further exposed onto the ink. By achieving the foregoing 2-step active ray exposure, it is possible to minimize shrinkage of recording materials which occurs during ink curing.

Heretofore, in the UV ink-jet system, in order to minimize dot spread and bleeding after ink deposition, commonly employed are high illumination intensity light sources which consume at least 1 kW·hr. However, currently, it is practically impossible to use such light sources due to excessive shrinkage of recording materials, especially in shrink label printing.

In the present invention, it is preferable to use active ray of the maximum illumination intensity in the wavelength region of 254 nm. Even when light sources at a total consumption of at least 1 kW·hr are employed, it is possible to form high-definition images and to control the shrinkage of recording materials within practical levels.

In the present invention, the total power consumption of light sources, which emit active radiation, is preferably less than 1 kW·hr. Examples of light sources at a total consumption of less than 1 kW·hr include, but are not limited to, fluorescent tubes, cold cathode tubes and LEDs.

The ink-jet recording apparatus (hereinafter, referred simply to as the recording apparatus) will now be described.

The recording apparatus of the present invention will be described with reference to the drawing when considered as necessary. The recording apparatus in the drawing is one embodiment of the recording apparatus of the present invention, but the recording apparatus of the present invention is not limited thereto.

FIG. 1 is a front view showing the structure of the main section of the recording apparatus of the present invention. Recording apparatus 1 is comprised of head carriage 2, recording head 3, exposure means 4, and platen section 5. In recording apparatus 1, platen section 5 is arranged under recording material P. Platen section 5 exhibits an ultraviolet ray absorbing function and absorbs excessive ultraviolet ray which passes through recording material P, whereby it is possible to consistently reproduce high-definition images.

Recording material P is guided by guide member 6 and moves from the front to the rear of FIG. 1y the operation of a conveying means (not shown). Head carriage 2 reciprocates in the Y direction in FIG. 1, whereby recording head 3, housed in head carriage 2, results in scanning.

Head carriage 2 is arranged above recording material P and houses a plurality of recording heads 3, described below, depending on the number of desired colors employed to print images. Ejection openings face downward. Head carriage 2 is arranged in recording apparatus 1 in such a manner that reciprocal motion is allowed in the Y direction in FIG. 1, driven by the head scanning means.

In FIG. 1, head carriage 2 houses recording heads 3 of white (W), yellow (Y), magenta (M), cyan (C), black (K), light yellow (Ly), light magenta (LM), light cyan (LC), light black (LK), and white (W). However, in practice, the number of colors housed in carriage 2 is based on a need basis.

Recording heads 3 eject an active radiation curable ink (e.g., a UV curable ink) fed from an ink supply means (not shown) onto recording material P from the ejection openings by operation of a plurality of ejection means provided within the apparatus. The UV ink ejected from recording heads 3 is comprised of colorants, polymerizable monomers, and initiators, and exhibits curing properties to such a degree that when exposed to ultraviolet radiation, monomers undergo crosslinking and polymerization reaction, while the foregoing initiators function as a catalyst.

Recording head 3 is scans from one edge of recording material P to the other edge in the Y direction in FIG. 1, while driven by the head scanning means. During scanning, a UV ink is ejected in the form of ink droplets onto a definite region (ink droplet receivable region), whereby ink droplets are impinged onto the foregoing ink droplet receiving region.

The foregoing scanning is appropriately repeated and the UV ink is ejected within one of the ink droplet receivable regions. Subsequently, recording material P is appropriately conveyed from the front to the rear of FIG. 1, employing a conveying means and scanning is repeated employing the head scanning means. During the foregoing scanning, the UV ink is ejected onto the subsequent ink droplet receiving region in the rear of FIG. 1, adjacent to the foregoing ink droplet receivable region.

The foregoing operation is then repeated and an image comprised of UV ink droplets is formed on recording material P ejected from recording heads 3, in synchronization with the head scanning means and the conveying means.

Exposure means 4 is comprised of an ultraviolet radiation lamp which emits ultraviolet radiation of a specified wavelength region at a uniform exposure energy, and a filter which transmits the ultraviolet radiation of the specified wavelengths. Herein, employed as the ultraviolet radiation lamp may be a mercury lamp, a metal halide lamp, an excimer laser, an ultraviolet laser, a hot cathode tube, a cold cathode tube, a black-light lamp, and an LED (being a light emitting diode). Of these, preferred are a band-shaped metal halide lamp, a cold cathode tube, a mercury lamp, and a black-light lamp. Specifically preferred are a low-pressure mercury lamp, a hot cathode tube, a cold cathode tube and a sterilization lamp which emit ultraviolet radiation at a wavelength of 254 nm, whereby bleeding is minimized, and dot diameter is effectively controlled. By employment of a hot cathode tube as a radiation source of exposure means 4, it is possible to produce exposure means 4 to cure the UV ink at lower cost.

Exposure means 4 is structured to be nearly equal to the maximum size which can be housed in recording apparatus 1 (being a UV ink-jet printer) of the ink dot receiving region, in which the UV ink is ejected during one cycle of scanning, in which recording heads 3 are driven by the head scanning means, or is structured to be larger than the ink dot receiving region.

Exposure means 4 are arranged and fixed on both sides of head carriage 2, being nearly equidistant from recording material P.

As noted above, as a means to control illuminance in the ink ejection section, obviously, all recording heads 3 must be shielded from light. In addition, it is effective that distance h2 between ink ejection section 31 of recording heads 3 and recording material P is maintained to be greater than distance h1 between exposure means 4 and recording material P (i.e., h1<h2) and/or distance d between recording heads 3 and exposure means 4 increases (d increases). Further, it is more preferable that bellows structure 7 is arranged between recording heads 3 and exposure means 4.

Herein, it is possible to change to the suitable wavelength of ultraviolet radiation which is employed by exposure means 4, by replacing the ultraviolet radiation lamp or filters provided in exposure means 4.

The ink of this invention is very superior in ink ejection stability, so that it is effectively employed for image formation using a line head type recording apparatus.

Figure 2:
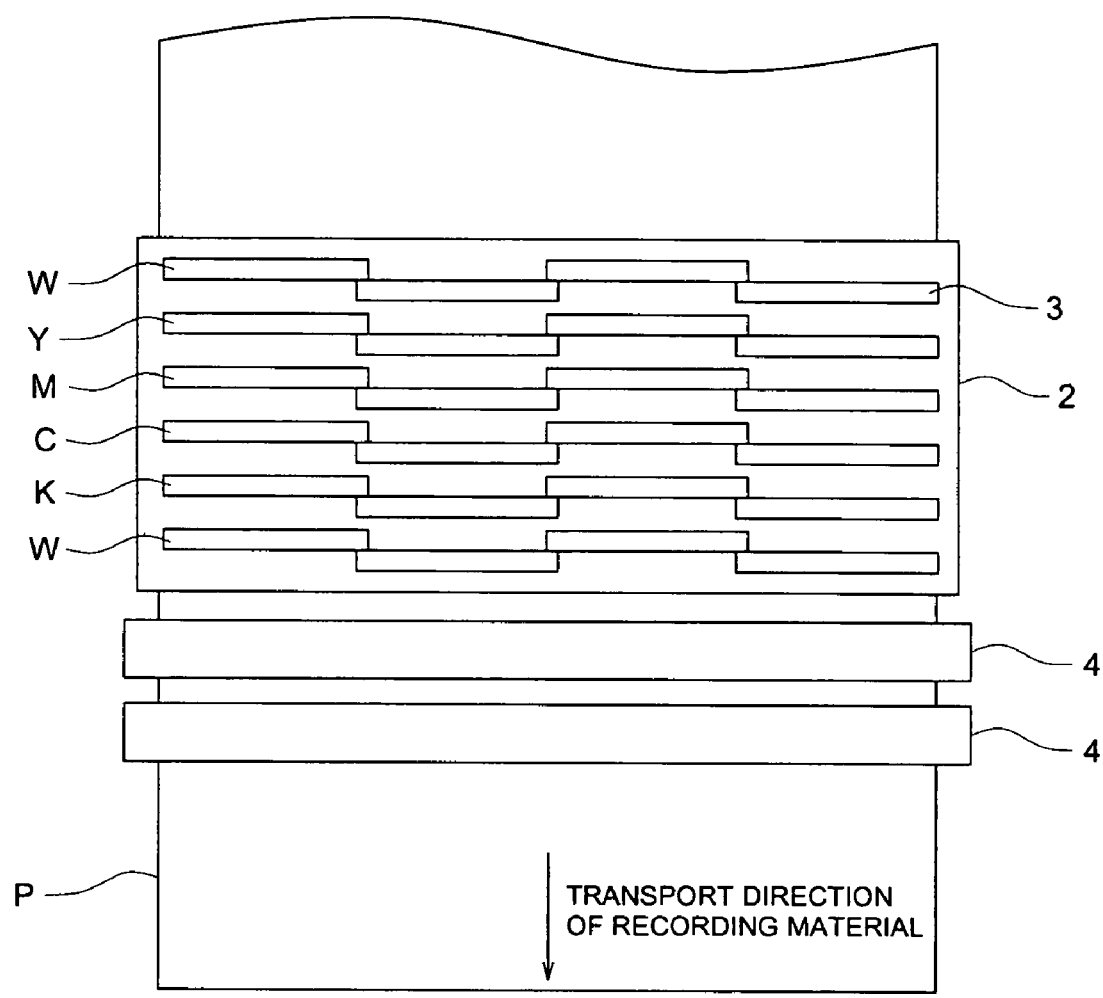
FIG. 2 is a top view showing an example of the constitution of substantial parts of an ink-jet recording apparatus employed in this invention.

FIG. 2 is a top view of another example showing the structure of the main section of the recording apparatus of the present invention.

The ink recording apparatus shown in FIG. 2 is a so-called line head method, in which a plurality of ink jet recording heads 3 for each color are arranged and fixed to head carriage 2 so as to eject onto the full width of recording material P.

Meantime, downstream of head carriage 2, exposure means 4 is provided to similarly enable ejection onto the total ink printing area, thereby enabling printing of the full width of recording material P. The UV lamp used in exposure means 4 is similar to the one described in FIG. 1.

In this line head method, head carriage 2 and exposure means 4 are fixed and only recording material P is conveyed, after which ink ejection and curing are conducted to form images.

EXAMPLE

The present invention is further described with the exemplified examples below, but the present invention is not limited to these examples.

Example 1

Preparation of Pigment Dispersion

Preparation of Pigment Dispersion D-1

Added to a stainless steel beaker were the following compounds, after which the mixture was heated on a hot plate to 65° C. and dissolved while stirring for one hour.

| | |
|---|---|
| PB 822 (being a polymer dispersion agent, produced by Ajinomoto-Fine-Techno Co., Inc.) | 6 parts |
| OXT 221 (being an oxetane compound, produced by Toagosei Co., Ltd.) | 74 parts |

Subsequently, after the solution was cooled to room temperature, the following colorant was added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-1.

| | |
|---|---|
| C. I. Pigment Blue 15: 4 | 20 parts |

Preparation of Pigment Dispersion D-2

Added to a stainless steel beaker were the following compounds, after which the mixture was heated on a hot plate to 65° C. and dissolved while stirring for one hour.

| | |
|---|---|
| PB 822 (being a polymer dispersion agent, produced by Ajinomoto-Fine-Techno Co., Inc.) | 6 parts |
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-2.

| C. I. Pigment Black 7 | 20 parts |
|---|---|

Preparation of Ink Composition

To the pigment dispersions prepared above or the oil soluble dyes described in Table 1, sequentially mixed were the following additives described in Table 1, after which the resulting solution was filtered using a 1.0 μm membrane filter to prepare Ink Compositions 1-12. The numerical number described in Table 1 is a weight %.

The details of each additives described by an abbreviated name in Table 1 are as follows.

Oil soluble dye
  *1: C. I. Solvent Blue 70
  *2: Oil Black 860 (produced by Orient Chemical Industries, Ltd.)

Oxetane compound
  OXT 221: di[1-ethyl(3-oxetanyl)]methyl ether (produced by Toagosei Co., Ltd.)
  OXT 212: produced by Toagosei Co., Ltd.
  OXT 211: produced by Toagosei Co., Ltd.
  OXT 101: produced by Toagosei Co., Ltd.
  EP-1: Exemplified compound EP-1
  DPE: 1,2: 8,9 diepoxy limonene
  PO: α-pinene oxide Diol compound
  DI-1: Exemplified compound DI-1
  DI-2: Exemplified compound DI-2
  DI-3: Exemplified compound DI-3
  DI-14: Exemplified compound DI-14
  DI-17: Exemplified compound DI-17
  EG: Ethylene glycol
  PEG: Phenylethylene glycol Photopolymerization initiator
  SP-152: triphenyl sulfonium salt (being Adeka Optomer SP-152, produced by Asahi Denka Co., Ltd.)

Surface active agent
  F475: Megaface F475 (being a perfluoro alkyl group containing acryl oligomer, produced by Dainippon And Chemical, Inc.)

Evaluation of Curability

Each of the ink compositions prepared above was coated onto Polyethylene terephthalate film (having a thickness of 150 μm) using a wire-bar method so as to obtain a wet layer thickness of about 5 μm, after which the coated layer was radiated at illuminance of 80 mW/cm$^2$ (illuminance being a value at 254 nm using UVPF-A1, manufactured by IWASAKI ELECTRIC Co., Ltd.) for 30 seconds using a low pressure mercury vapor lamp.

Subsequently, by touching the coated surface after radiation of a low pressure mercury vapor lamp, curability was evaluated based on the following criteria.

A: Almost no tackiness was felt on the formed image surface.
  B: Slight tackiness was felt on the formed image surface.
  C: Tackiness was felt on the formed image surface, but no peeling was observed by rubbing.
  D: The formed image was not cured and flew.

TABLE 1

| Ink composition No. | Pigment dispersion No. | Pigment dispersion Added amount | Oil soluble dye Kind | Oil soluble dye Added amount | Oxetane compound Kind | Oxetane compound Added amount | Epoxy compound Kind | Epoxy compound Added amount | Diol compound Kind | Diol compound Added amount |
|---|---|---|---|---|---|---|---|---|---|---|
| 1 | D-1 | 20.0 | — | — | OXT221 | 47.18 | EP-1 | 28.31 | DI-1 | 4.00 |
| 2 | D-1 | 19.0 | — | — | OXT221 | 50.36 | EP-1 | 28.31 | DI-3 | 0.50 |
| 3 | D-1 | 20.0 | — | — | OXT221 | 47.81 | EP-1 | 28.31 | DI-1 | 2.00 |
| 4 | — | — | *1 | 3.80 | OXT221 | 57.68 | EP-1 | 28.31 | DI-2 | 0.30 |
| 5 | — | — | *1 | 4.00 | OXT221 | 58.47 | EP-1 | 28.31 | DI-1 | 1.00 |
| 6 | D-1 | 17.0 | — | — | OXT221 | 49.86 | EP-1 | 28.31 | — | — |
| 7 | D-1 | 18.0 | — | — | OXT212 | 31.48 | DEP | 50.00 | — | — |
| 8 | D-2 | 20.0 | — | — | OXT212 | 57.48 | DEP | 18.00 | DI-17 | 4.00 |
| 9 | — | — | *2 | 4.30 | OXT212 | 72.08 | DEP | 20.00 | DI-17 | 3.10 |
| 10 | D-1 | 18.0 | — | — | OXT212 | 57.48 | PO | 20.00 | DI-14 | 4.00 |
| 11 | D-2 | 16.0 | — | — | OXT212 | 46.48 | EP-1 | 22.00 | DI-17 | 15.00 |
| 12 | D-2 | 18.0 | — | — | OXT212 | 31.48 | DEP | 20.00 | DI-1 | 16.00 |

| Ink composition No. | Diol compound Kind | Diol compound Added amount | Photopolymerization initiator SP-152 | Surface Active agent F475 | Evaluation result Curability | Remarks |
|---|---|---|---|---|---|---|
| 1 | — | — | 0.50 | 0.02 | A | Inv. |
| 2 | — | — | 0.50 | 0.02 | A | Inv. |
| 3 | DI-3 | 1.00 | 0.50 | 0.01 | A | Inv. |
| 4 | — | — | 0.50 | 0.02 | A | Inv. |
| 5 | DI-2 | 1.00 | 0.50 | 0.03 | A | Inv. |
| 6 | EG | 4.50 | 0.50 | 0.02 | C | Comp. |
| 7 | — | — | 0.50 | 0.02 | D | Comp. |
| 8 | — | — | 0.50 | 0.02 | B | Inv. |
| 9 | — | — | 0.50 | 0.02 | A | Inv. |
| 10 | — | — | 0.50 | 0.02 | A | Inv. |

TABLE 1-continued

| | | | | | | |
|---|---|---|---|---|---|---|
| 11 | — | — | 0.50 | 0.02 | C | Comp. |
| 12 | PEG | 11.0 | 0.50 | 0.02 | D | Comp. |

Note:
Inv.: This invention
Comp.: Comparative example

As is apparent from the results described in Table 1, it was proven that the ink composition of the present invention which contained the compound having an alicyclic epoxy group defined in this invention and also the compound having a diol structure defined in this invention contained in a specific amount, exhibited higher curing rate resulting in superiority in curability, compared to the comparative examples.

Example 1a

Preparation of Pigment Dispersion D-1a

Added to a stainless steel beaker were the following compounds, after which the mixture was heated on a hot plate to 65° C. and dissolved while stirring for one hour.

| | |
|---|---|
| PB 822 (being a polymer dispersion agent, produced by Ajinomoto-Fine-Techno Co., Inc.) | 6 parts |
| OXT 221 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over two hours using a paint shaker. After that, the zirconia beads were removed to prepare Pigment Dispersion D-1a.

| | |
|---|---|
| C. I. Pigment Blue 15: 4 | 20 parts |

Preparation of Pigment Dispersion D-2a

Added to a stainless steel beaker were the following compounds, after which the mixture was heated on a hot plate to 65° C. and dissolved while stirring for one hour.

| | |
|---|---|
| PB 822 (being a polymer dispersion agent, produced by Ajinomoto-Fine-Techno Co., Inc.) | 6 parts |
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-2a.

| | |
|---|---|
| C. I. Pigment Black 7 | 20 parts |

Preparation of Ink Composition

The compositions described in Table 1a were mixed and dissolved, after which the resulting solution was filtered using a 1.0 μm membrane filter, to prepare Ink Compositions.

TABLE 1a

| Ink composition | Dispersion D-1a | Dispersion D-2a | C.I. Solvent Blue 70 | Oil Black 860 | OXT 221 | OXT 211 | EP-1a | EP-2a | DI-1a | DI-2a | SP 152 | Megaface F475 | Remarks |
|---|---|---|---|---|---|---|---|---|---|---|---|---|---|
| 1 | 20.00 | | | | 47.18 | | 28.31 | | 4.00 | | 0.50 | 0.02 | Inv. |
| 2 | | | 3.80 | | 55.68 | | 35.00 | | 5.00 | | 0.50 | 0.02 | Inv. |
| 3 | 20.00 | | | | 44.68 | | 26.81 | | | 8.00 | 0.50 | 0.02 | Inv. |
| 4 | 18.00 | | | | 46.48 | | | 35.00 | | | 0.50 | 0.02 | Comp. |
| 5 | | 20.00 | | | | 44.48 | | 30.00 | 5.00 | | 0.50 | 0.02 | Inv. |
| 6 | | | | 4.30 | | 61.18 | | 33.00 | 1.00 | | 0.50 | 0.02 | Inv. |
| 7 | | 16.00 | | | | 63.48 | 20.00 | | | | 0.50 | 0.02 | Comp. |
| 8 | | 20.00 | | | | 43.48 | | 20.00 | 16.00 | | 0.50 | 0.02 | Comp. |

The structures of the compounds described in Table 1a were as follows. Further, a viscosity of each composition was 30-41 mPa·s.

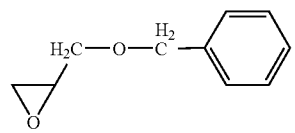

EP-1a

-continued

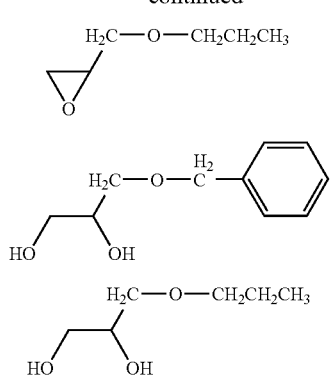

Evaluation of Curability

After each of the inks was coated onto PET: polyethylene terephthalate to be a thickness of about 5 μm, the coated layer was radiated at illuminance of 80 mW/cm² (illuminance being a value at 254 nm using UVPF-A1, manufactured by IWASAKI ELECTRIC Co., Ltd.) for 30 seconds using a low pressure mercury vapor lamp. After radiation, curability was evaluated by touching the surface by fingers.

A: The surface exhibited no tackiness.
B: The surface exhibited slight tackiness.
C: The surface exhibited some tackiness, but no peeling by rubbing.
D: The surface was not cured and still fluid.

TABLE 2a

| Ink composition | Curability | Remarks |
|---|---|---|
| 1a | A | Inv. |
| 2a | A | Inv. |
| 3a | B | Inv. |
| 4a | D | Comp. |
| 5a | A | Inv. |
| 6a | A | Inv. |
| 7a | C | Comp. |
| 8a | D | Comp. |

As is apparent, it is proven that the active ray curable ink-jet ink compositions of this invention were superior in curability.

Example 2

Preparation of Pigment Dispersion

Preparation of Pigment Dispersion D-3

Added to a stainless steel beaker were the following compounds, after which the mixture was heated on a hot plate to 65° C. and dissolved while stirring for one hour.

Solsperse 32000 (being a polymer dispersion agent, produced by Avecia Limited) 6 parts OXT 221 (being an oxetane compound, produced by Toagosei Co., Ltd.) 74 parts Subsequently, after the solution was cooled to room temperature, the following colorant was added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-3.

| C. I. Pigment Red 57: 1 | 20 parts |
|---|---|

Preparation of Pigment Dispersion D-4

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 101 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-4.

| C. I. Pigment Yellow 13 | 20 parts |
|---|---|

Preparation of Pigment Dispersion D-5

Added to a stainless steel beaker were the following compounds, after which the mixture was heated on a hot plate to 65° C. and dissolved while stirring for one hour.

| PB 822 (being a polymer dispersion agent, produced by Ajinoinoto-Fine-Techno Co., Inc.) | 6 parts |
|---|---|
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-5.

| C. I. Pigment Yellow 138 | 20 parts |
|---|---|

Preparation of Pigment Dispersion D-6

Added to a stainless steel beaker were the following compounds, after which the mixture was heated on a hot plate to 65° C. and dissolved while stirring for one hour.

| | |
|---|---:|
| PB 822 (being a polymer dispersion agent, produced by Ajinomoto-Fine-Techno Co., Inc.) | 6 parts |
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-6.

| | |
|---|---:|
| C. I. Pigment Violet 19 | 20 parts |

Preparation of Pigment Dispersion D-7

Added to a stainless steel beaker were the following compounds, after which the mixture was heated on a hot plate to 65° C. and dissolved while stirring for one hour.

| | |
|---|---:|
| PB 822 (being a polymer dispersion agent, produced by Ajinomoto-Fine-Techno Co., Inc.) | 6 parts |
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-7.

| | |
|---|---:|
| C. I. Pigment Blue 15:4 | 20 parts |

Preparation of Pigment Dispersion D-8

Added to a stainless steel beaker were the following compounds, after which the mixture was heated on a hot plate to 65° C. and dissolved while stirring for one hour.

| | |
|---|---:|
| PB 822 (being a polymer dispersion agent, produced by Ajinomoto-Fine-Techno Co., Inc.) | 6 parts |
| OXT 221 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-8.

| | |
|---|---:|
| C. I. Pigment Black 7 | 20 parts |

Preparation of Ink Composition and Ink Set

Using the pigment dispersions prepared above and in Example 1, each of additives described in Tables 2-7 was sequentially mixed, and the mixture was filtered using a 1.0 μm membrane filter to prepare the ink composition. Combining these compositions, Ink Sets 1-6 were prepared. Further, values described in Tables 2-7 were "weight %".

TABLE 2

| | | Ink composition (weight %) | | | | | | | | | |
|---|---|---|---|---|---|---|---|---|---|---|---|
| | | Pigment dispersion | | Photopolymerizable compound | | | | | | | Photopolymerization initiator |
| | | | | Oxetane compound | | Epoxy compound | | Diol compound | | | |
| | | | | | | | | 1 | | 2 | |
| | Ink kind | Kind | Added amount | OXT221 | OXT212 | Kind | Added amount | kind | added amount | kind | added amount | SP-152 |
| Ink Set 1 | Y | D-4 | 15.0 | 59.5 | — | EP-1 | 20.0 | DI-1 | 5.0 | — | — | 0.50 |
| | M | D-3 | 18.0 | 57.5 | — | EP-4 | 20.0 | DI-9 | 4.0 | — | — | 0.50 |
| | C | D-1 | 19.0 | 49.5 | — | EP-1 | 20.0 | DI-1 | 2.0 | DI-2 | 2.0 | 0.50 |
| | K | D-2 | 20.0 | 40.5 | 10.0 | EP-1 | 25.0 | DI-3 | 1.0 | — | — | 0.50 |

TABLE 3

Ink composition (weight %)

| | | | Photopolymerizable compound | | | | | | | Photo-polymerization initiator |
|---|---|---|---|---|---|---|---|---|---|---|
| | Pigment dispersion | | Oxetane compoumd | | Epoxy compound | | Diol compound 1 | | Diol compound 2 | |
| Ink kind | Kind | Added amount | OXT221 | OXT212 | Kind | Added amount | kind | added amount | kind | added amount | SP-152 |
| Ink Set 2 Y | D-4 | 15.0 | 42.5 | 10.0 | EP-1 | 25.0 | DI-1 | 7.0 | — | — | 0.50 |
| M | D-3 | 18.0 | 53.5 | — | EP-4 | 20.0 | DI-9 | 8.0 | — | — | 0.50 |
| C | D-1 | 19.0 | 49.5 | — | EP-4 | 25.0 | DI-9 | 3.0 | — | — | 0.40 |
| K | D-2 | 20.0 | 48.5 | 5.0 | EP-1 | 25.0 | DI-2 | 1.0 | — | — | 0.50 |

TABLE 4

Ink composition (weight %)

| | | | Photopolymerizable compound | | | | | | | Photo-polymerization initiator |
|---|---|---|---|---|---|---|---|---|---|---|
| | Pigment dispersion | | Oxetane compoumd | | Epoxy compound | | Diol compound 1 | | Diol compound 2 | |
| Ink kind | Kind | Added amount | OXT221 | OXT212 | Kind | Added amount | kind | added amount | kind | added amount | SP-152 |
| Ink Set 3 Y | D-4 | 15.0 | 44.5 | — | EP-4 | 25.0 | DI-9 | 15.0 | — | — | 0.50 |
| M | D-3 | 18.0 | 61.5 | — | EP-4 | 20.0 | — | — | — | — | 0.50 |
| C | D-1 | 19.0 | 46.5 | — | EP-4 | 28.0 | DI-3 | 6.0 | — | — | 0.50 |
| K | D-2 | 20.0 | 34.5 | — | EP-1 | 25.0 | DI-1 | 20.0 | — | — | 0.50 |

TABLE 5

Ink composition (weight %)

| | | | Photopolymerizable compound | | | | | | | | | Surface active agent | Photo-polymerization initiator |
|---|---|---|---|---|---|---|---|---|---|---|---|---|---|
| | Pigment dispersion | | Oxetane compound | | | Epoxy compound | | Diol compound 1 | | Diol compound 2 | | | |
| Ink kind | Kind | Added amount | OXT 221 | OXT 2122 | OXT 2111 | EP-1 | DEP | Kind | Added amount | Kind | Added amount | F475 | SP-152 |
| Ink Set 4 Y | D-5 | 16.5 | 51.5 | 4.0 | 2.0 | 20.0 | — | DI-1 | 3.0 | DI-2 | 2.0 | 0.5 | 0.50 |
| M | D-6 | 19.0 | 61.4 | — | — | 18.0 | — | DI-9 | 4.0 | — | — | 0.2 | 0.40 |
| C | D-7 | 19.0 | 48.0 | 5.0 | — | — | 22.0 | DI-15 | 5.0 | — | — | 0.5 | 0.50 |
| K | D-8 | 19.0 | 53.9 | — | — | 5.0 | 16.0 | DI-15 | 5.0 | — | — | 0.6 | 0.50 |
| Lm | D-6 | 5.0 | 56.9 | — | 5.0 | 30.0 | — | DI-1 | 1.0 | DI-2 | 1.0 | 0.5 | 0.60 |
| Lc | D-7 | 4.0 | 63.4 | — | — | — | 30.0 | DI-17 | 2.0 | — | — | 0.1 | 0.50 |

TABLE 6

| | | | Ink composition (weight %) | | | | | | | | | | | |
|---|---|---|---|---|---|---|---|---|---|---|---|---|---|---|
| | | Pigment dispersion | Photopolymerizable compound | | | | | Diol compound | | | | | | Surface active agent | Photo-polymerization initiator |
| | | | Oxetane compoumd | | | Epoxy compound | | 1 | | 2 | | 3 | | | |
| Ink kind | | Kind | Added amount | OXT 221 | OXT 212 | OXT 211 | EP-1 | DEP | Kind | Added amount | Kind | Added amount | Kind | Added amount | F475 | *A |
| Ink Set 5 | Y | D-5 | 15.0 | 50.9 | — | — | 25.0 | — | DI-1 | 8.0 | — | — | — | — | 0.5 | 0.60 |
| | M | D-6 | 18.0 | 47.0 | 3.0 | — | — | 28.0 | DI-15 | 1.0 | DI-16 | 1.0 | DI-17 | 1.0 | 0.5 | 0.50 |
| | C | D-7 | 19.0 | 45.2 | — | — | — | 30.0 | DI-16 | 5.0 | — | — | — | — | 0.3 | 0.50 |
| | K | D-8 | 19.0 | 53.1 | — | 3.0 | 20.0 | — | DI-1 | 4.0 | — | — | — | — | 0.5 | 0.40 |
| | Lm | D-6 | 5.0 | 61.2 | — | — | 25.0 | — | DI-1 | 8.0 | — | — | — | — | 0.3 | 0.50 |
| | Lc | D-7 | 4.0 | 58.0 | — | — | 30.0 | — | DI-15 | 7.0 | — | — | — | — | 0.5 | 0.50 |

*A: F475

TABLE 7

| | | | Ink composition (weight %) | | | | | | | | | |
|---|---|---|---|---|---|---|---|---|---|---|---|---|
| | | Pigment dispersion | Photopolymerizable compound | | | | | Diol compound 1 | | Surface active agent | Photo-polymerization initiator |
| | | | | Oxetane compoumd | | | Epoxy compound | | | | | |
| Ink kind | | Kind | Added amount | OXT221 | OXT212 | OXT211 | EP-1 | DEP | Kind | Added amount | F475 | SP-152 |
| Ink Set 6 | Y | D-5 | 16.5 | 52.5 | — | — | 25.0 | — | DI-17 | 5.0 | 0.5 | 0.50 |
| | M | D-6 | 19.0 | 55.1 | 5.0 | — | — | 20.0 | — | — | 0.5 | 0.40 |
| | C | D-7 | 19.0 | 42.9 | — | — | — | 25.0 | DI-15 | 12.0 | 0.6 | 0.50 |
| | K | D-8 | 19.0 | 36.9 | — | 2.0 | 30.0 | — | DI-1 | 11.0 | 0.5 | 0.60 |
| | Lm | D-6 | 5.0 | 61.2 | — | — | 33.0 | — | — | — | 0.3 | 0.50 |
| | Lc | D-7 | 4.0 | 74.0 | 1.0 | 1.0 | — | 19.0 | — | — | 0.5 | 0.50 |

Formation of Ink-jet Image

Image Forming Method A

To the ink-jet recording apparatus comprised of the compositions as described in FIG. 1, which is provided with piezo type ink-jet nozzles, each of Ink Composition Sets 1-3 prepared as above was loaded, and the following image recording was continuously conducted onto the recording material of a web roll of 600 mm width and 500 m length, described in Table 8, to obtain Images 1-9. The ink supply system consisted of an ink tank, a supply pipe, an anterior chamber ink tank immediately preceding a head, piping provided with a filter, and a piezo head. The portion from the anterior chamber to the head was thermally insulated and heated to 50° C. The piezo head was driven to eject multi-sized dots of 2-20 pl at resolution of 720×720 dpi, and each of inks was continuously ejected. After deposition of each ink, ultraviolet radiation, from lamp units provided on both sides of the carriage, was instantaneously conducted (being less than 0.5 seconds after ink deposition). After image recording, the total ink layer thickness was measured, and the thickness was within the range of 2.3-13 μm. Herein, "dpi" in this invention is dots per inch (being 2.54 cm). Formation of the ink-jet image was conducted under the conditions of 25° C. and 30% RH.

Image Forming Method B

Images 10-18 were prepared in the same manner as in above Image Forming Method A, except that an ink-jet recording apparatus with a line head recording method described in FIG. 2 was employed as an ink-jet recording apparatus, and each of Ink Sets 4-6 was loaded.

The details of recording materials described in Table 8 were as follows.

OPP: oriented polypropylene

PET: polyethylene terephthalate

Shrink OPS: commercially available oriented polystyrene for shrink packaging.

Further, details of radiation light sources described in Table 8 were as below.

Radiation light source A: a high-pressure mercury vapor lamp VZero 085 (manufactured by Integration Technology, Inc.)

Radiation light source B: a low pressure mercury vapor lamp (being a special order item from Iwasaki Electric Co., Ltd.).

Further, each illuminance of radiation light sources described in Table 8 was an accumulated illuminance at 254 nm, measured using UVPF-A1 manufactured by Iwasaki Electric Co., Ltd.

TABLE 8

| Sample No. | Ink Set No. | Recording material Kind | Radiation light source | Radiation method (area) Radiation location | Light source | Radiation timing (after deposition) | On surface of recording material Peak waveength (nm) | Maximum illuminance (mV/cm²) | Remarks |
|---|---|---|---|---|---|---|---|---|---|
| 1 | 1 | OPP | A | *1 | Linear light source | After 0.1 sec. | 254 | 400 | Inv. |
| 2 | 1 | PET | A | *1 | Linear light source | After 0.1 sec. | 254 | 400 | Inv. |
| 3 | 1 | PVC | A | *1 | Linear light source | After 0.1 sec. | 254 | 400 | Inv. |
| 4 | 2 | OPP | A | *1 | Linear light source | After 0.1 sec. | 254 | 400 | Inv. |
| 5 | 2 | PET | A | *1 | Linear light source | After 0.1 sec. | 254 | 400 | Inv. |
| 6 | 2 | PVC | A | *1 | Line source | After 0.1 sec. | 254 | 400 | Inv. |
| 7 | 3 | OPP | A | *1 | Linear light source | After 0.1 sec. | 254 | 400 | Comp. |
| 8 | 3 | PET | A | *1 | Linear light source | After 0.1 sec. | 254 | 400 | Coup. |
| 9 | 3 | PVC | A | *1 | Linear light source | After 0.1 sec. | 254 | 400 | Comp. |
| 10 | 4 | OPP | B | *2 | Linear light source | After 0.1 sec. | 254 | 50 | Inv. |
| 11 | 4 | PET | B | *2 | Linear light source | After 0.1 sec. | 254 | 50 | Inv. |
| 12 | 4 | PVC | B | *2 | Linear light source | After 0.1 sec. | 254 | 50 | Inv. |
| 13 | 5 | OPP | B | *2 | Linear light source | After 0.1 sec. | 254 | 50 | Inv. |
| 14 | 5 | PET | B | *2 | Linear light source | After 0.1 sec. | 254 | 50 | Inv. |
| 15 | 5 | PVC | B | *2 | Linear light source | After 0.1 sec. | 254 | 50 | Inv. |
| 16 | 6 | OPP | B | *2 | Linear light source | After 0.1 sec. | 254 | 50 | Comp. |
| 17 | 6 | PET | B | *2 | Linear light source | After 0.1 sec. | 254 | 50 | Comp. |
| 18 | 6 | PVC | B | *2 | Linear light source | After 0.1 sec. | 254 | 50 | Comp. |

*1: both sides of the recording head (FIG. 1 method)
*2: downstream of the conveyance direction of the recording material (FIG. 2 method)

Evaluation of Ink-jet Recorded Image

Regarding each of images recorded with above image forming method, the following evaluation was conducted.

Evaluation of Color Mixing

Dots of each color of Y, M, C and K were printed so as to be adjacent, and each color dot next to other color dots was visually observed under magnification using a loupe to evaluate color mixing, being bleeding, based on the following criteria.

A: Adjacent dots maintained perfect circularity, and no bleeding was observed.
B: Adjacent dots maintained nearly perfect circularity, and only slight bleeding was observed.
C: Adjacent dots bled slightly with noticeable loss of circularity, but still at a barely usable level.
D: Adjacent dots bled and obviously mixed with each other, resulting in at an unacceptable level.

The evaluation results of the above tests are shown in Table 9.

TABLE 9

| Image No. | Color mixing (bleeding resistance) | Remarks |
|---|---|---|
| 1 | A | Inv. |
| 2 | A | Inv. |
| 3 | A | Inv. |
| 4 | B | Inv. |
| 5 | B | Inv. |
| 6 | B | Inv. |
| 7 | D | Comp. |
| 8 | D | Comp. |
| 9 | D | Comp. |
| 10 | A | Inv. |
| 11 | A | Inv. |
| 12 | A | Inv. |
| 13 | B | Inv. |
| 14 | B | Inv. |
| 15 | B | Inv. |

TABLE 9-continued

| Image No. | Color mixing (bleeding resistance) | Remarks |
|---|---|---|
| 16 | D | Comp. |
| 17 | D | Comp. |
| 18 | D | Comp. |

As is apparent from the results described in Table 9, it was proven that the ink sets of the present invention which contained the compound having an alicyclic epoxy group defined in this invention, and also the compound having a diol structure defined in this invention contained in a specific amount, exhibited reduced color bleeding, and extreamly reduced color mixing in each color, compared to the comparative examples.

Example 2a

Preparation of Pigment Dispersion D-3a

Added to a stainless steel beaker were the following compounds, after which the mixture was heated on a hot plate to 65° C. and dissolved while stirring for one hour.

| | |
|---|---|
| PB 822 (being a polymer dispersion agent, produced by Ajinomoto-Fine-Techno Co., Inc.) | 6 parts |
| OXT 221 (being an oxetane compound, produced by Toagosei Co., Ltd.) | 74 parts |

Subsequently, after the solution was cooled to room temperature, the following colorant was added to the solution, after which the resulting solution was poured into a glass bottle together with 200 g of 1 mm diameter zirconia beads, and sealed tightly, and then dispersion treatment was conducted over two hours using a paint shaker. After that, the zirconia beads were removed to prepare Pigment Dispersion D-3a.

| C. I. Pigment Red 57:1 | 20 parts |
|---|---|

Preparation of Pigment Dispersion D-4a

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 101 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-4a.

| C. I. Pigment Yellow 13 | 20 parts |
|---|---|

Preparation of Pigment. Dispersion D-5a

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over two hours using a paint shaker. After that, the zirconia beads were removed to prepare Pigment Dispersion D-5a.

| C. I. Pigment Yellow 13 | 20 parts |
|---|---|

Preparation of Pigment Dispersion D-6a

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-6a.

| C. I. Pigment Violet 19 | 20 parts |
|---|---|

Preparation of Pigment Dispersion D-7a

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 211 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over two hours using a paint shaker. After that, the zirconia beads were removed to prepare Pigment Dispersion D-7a.

| C. I. Pigment Blue 15:4 | 20 parts |
|---|---|

Preparation of Pigment Dispersion D-8a

Added to a stainless steel beaker were the following compounds, after which the mixture was heated on a hot plate to 65° C. and dissolved while stirring for one hour.

| PB 822 (being a polymer dispersion agent, produced by Ajinomoto-Fine-Techno Co., Inc.) | 6 parts |
|---|---|
| OXT 221 (being an oxetane compound, produced by Toagosei Co., Ltd.) | 74 parts |

Subsequently, after the solution was cooled to room temperature, the following colorant were added to the solution, after which the resulting solution was poured into a glass bottle together with 200 g of 1 mm diameter zirconia beads, and sealed tightly, and then dispersion treatment was conducted over four hours using a paint shaker. After that, the zirconia beads were removed to prepare Pigment Dispersion D-8a.

| | |
|---|---|
| C. I. Pigment Black 7 | 20 parts |

Preparation of Ink Composition and Ink Set

Using the pigment dispersions prepared above and in Example 1a, each of additives described in Tables 3a-10a was sequentially mixed, and the mixture was filtered using a 1.0 μm membrane filter to prevent filter clogging, to prepare Ink Composition Sets 1a-8a.

A viscosity of each ink composition set prepared above was below. A viscosity was a range of the maximum viscosity and the minimum viscosity of each color ink.

Ink Composition Set 1a: 20-30 mPa·s

Ink Composition Set 2a: 20-30 mPa·s

Ink Composition Set 3a: 20-30 mPa·s

Ink Composition Set 4a: 20-30 mPa·s

Ink Composition Set 5a: 25-34 mPa·s

Ink Composition Set 6a: 25-34 mPa·s

Ink Composition Set 7a: 25-34 mPa·s

Ink Composition Set 8a: 25-34 mPa·s

TABLE 3a

Ink Composition Set 1a

| | Y | M | C | K |
|---|---|---|---|---|
| Dispersion (Kind) | D-4a | D-3a | D-1a | D-2a |
| Dispersion (Amount) | 15.0 | 18.0 | 19.0 | 20.0 |
| OXT 221 | | 57.5 | 49.5 | |
| OXT 211 | | | | 50.5 |
| OXT 101 | 54.5 | | | |
| EP-1a | | | | 25.0 |
| EP-6a | 25.0 | 20.0 | 28.0 | |
| DI-1a | | | | 1.0 |
| DI-3a | | | | |
| DI-5a | | | | |
| DI-6a | 5.0 | 4.0 | 3.0 | |
| SP152 | 0.5 | 0.5 | 0.5 | 0.5 |

TABLE 4a

Ink Composition Set 2a

| | Y | M | C | K |
|---|---|---|---|---|
| Dispersion (Kind) | D-4a | D-3a | D-1a | D-2a |
| Dispersion (Amount) | 15.0 | 18.0 | 19.0 | 20.0 |
| OXT 221 | | 55.5 | 49.5 | |
| OXT 211 | | | | 50.5 |
| OXT 101 | 54.5 | | | |
| EP-1a | | | | 25.0 |
| EP-6a | 25.0 | 20.0 | 28.0 | |
| DI-1a | | | | |
| DI-3a | | 6.0 | | |
| DI-5a | | | | 4.0 |
| DI-6a | 5.0 | | 3.0 | |
| SP152 | 0.5 | 0.5 | 0.5 | 0.5 |

TABLE 5a

Ink Composition Set 3a

| | Y | M | C | K |
|---|---|---|---|---|
| Dispersion (Kind) | D-4a | D-3a | D-1a | D-2a |
| Dispersion (Amount) | 15.0 | 18.0 | 19.0 | 20.0 |
| OXT 221 | | 55.5 | 49.5 | |
| OXT 211 | | | | 50.5 |
| OXT 101 | 54.5 | | | |
| EP-1a | | | | 25.0 |
| EP-6a | 25.0 | 20.0 | 28.0 | |
| DI-1a | | | | |
| DI-3a | | 6.0 | | |
| DI-5a | | | | 4.0 |
| DI-6a | 5.0 | | 3.0 | |
| SP152 | 0.5 | 0.5 | 0.5 | 0.5 |

TABLE 6a

Ink Composition Set 4a

| | Y | M | C | K |
|---|---|---|---|---|
| Dispersion (Kind) | D-4a | D-3a | D-1a | D-2a |
| Dispersion (Amount) | 15.0 | 18.0 | 19.0 | 20.0 |
| OXT 221 | | 61.5 | 52.5 | |
| OXT 211 | | | | 34.5 |
| OXT 101 | 44.5 | | | |
| EP-1a | | | | 25.0 |
| EP-6a | 25.0 | 20.0 | 28.0 | |
| DI-1a | | | | 20.0 |
| DI-3a | | | | |
| DI-5a | | | | |
| DI-6a | 15.0 | | | |
| SP152 | 0.5 | 0.5 | 0.5 | 0.5 |

TABLE 7a

Ink Composition Set 5a

| | Y | M | C | K | LM | LC |
|---|---|---|---|---|---|---|
| Dispersion (Kind) | D-5a | D-6a | D-7a | D-8a | D-6a | D-7a |
| Dispersion (Amount) | 16.5 | 19.0 | 19.0 | 19.0 | 5.0 | 4.0 |
| OXT 221 | | | | 58.0 | | |
| OXT 211 | 59.5 | 58.0 | 53.0 | | 60.0 | 60.0 |
| EP-1a | 20.0 | 18.0 | | | 30.0 | |
| EP-3a | | | 22.0 | | | 30.0 |
| EP-5a | | | | 18.0 | | |
| DI-1a | 3.0 | 4.0 | | | 4.0 | 5.0 |
| DI-2a | | | | | | |
| DI-3a | | | 5.0 | | | |
| DI-5a | | | | 4.0 | | |
| DI-6a | | | | | | |
| DI-9a | | | | | | |
| Megaface F475 | 0.5 | 0.5 | 0.5 | 0.5 | 0.5 | 0.5 |
| SP152 | 0.5 | 0.5 | 0.5 | 0.5 | 0.5 | 0.5 |

TABLE 8a

Ink Composition Set 6a

| | Y | M | C | K | LM | LC |
|---|---|---|---|---|---|---|
| Dispersion (Kind) | D-5a | D-6a | D-7a | D-8a | D-6a | D-7a |

TABLE 8a-continued

Ink Composition Set 6a

| | Y | M | C | K | LM | LC |
|---|---|---|---|---|---|---|
| Dispersion (Amount) | 15.0 | 18.0 | 19.0 | 19.0 | 5.0 | 4.0 |
| OXT 221 | | | | 59.0 | | |
| OXT 211 | 60.0 | 57.5 | 55.0 | | 60.0 | 63.0 |
| EP-1a | 19.0 | 19.5 | | | 30.0 | |
| EP-3a | | | 20.0 | | | 30.0 |
| EP-5a | | | | 17.0 | | |
| DI-1a | | 4.0 | | | | |
| DI-2a | | | | 4.0 | | |
| DI-3a | | | 5.0 | | | |
| DI-5a | | | | 4.0 | | |
| DI-6a | 5.0 | | | | | |
| DI-9a | | | | | | 2.0 |
| Megaface F475 | 0.5 | 0.5 | 0.5 | 0.5 | 0.5 | 0.5 |
| SP152 | 0.5 | 0.5 | 0.5 | 0.5 | 0.5 | 0.5 |

TABLE 9a

Ink Composition Set 7a

| | Y | M | C | K | LM | LC |
|---|---|---|---|---|---|---|
| Dispersion (Kind) | D-5a | D-6a | D-7a | D-8a | D-6a | D-7a |
| Dispersion (Amount) | 17.0 | 17.0 | 18.0 | 19.0 | 4.5 | 3.8 |
| OXT 221 | | | | 62.0 | | |
| OXT 211 | 59.0 | 64.0 | 54.0 | | 56.5 | 60.2 |
| EP-1a | 20.0 | 18.0 | | | 30.0 | |
| EP-3a | | | 22.0 | | | 30.0 |
| EP-5a | | | | 18.0 | | |
| DI-1a | 3.0 | | | | | 5.0 |
| DI-2a | | | | | | |
| DI-3a | | | 5.0 | | | |
| DI-5a | | | | | 8.0 | |
| DI-6a | | | | | | |
| DI-9a | | | | | | |
| Megaface F475 | 0.5 | 0.5 | 0.5 | 0.5 | 0.5 | 0.5 |
| SP152 | 0.5 | 0.5 | 0.5 | 0.5 | 0.5 | 0.5 |

TABLE 10a

Ink Composition Set 8a

| | Y | M | C | K | LM | LC |
|---|---|---|---|---|---|---|
| Dispersion (Kind) | D-5a | D-6a | D-7a | D-8a | D-6a | D-7a |
| Dispersion (Amount) | 16.5 | 19.0 | 19.0 | 19.0 | 5.0 | 4.0 |
| OXT 221 | | | | 51.0 | | |
| OXT 211 | 62.5 | 62.0 | 46.0 | | 64.0 | 65.0 |
| EP-1a | 20.0 | 18.0 | | | 30.0 | |
| EP-3a | | | 22.0 | | | 30.0 |
| EP-5a | | | | 18.0 | | |
| DI-1a | | | | | | |
| DI-2a | | | 12.0 | | | |
| DI-3a | | | | | | |
| DI-5a | | | | 11.0 | | |
| DI-6a | | | | | | |
| DI-9a | | | | | | |
| Megaface F475 | 0.5 | 0.5 | 0.5 | 0.5 | 0.5 | 0.5 |
| SP152 | 0.5 | 0.5 | 0.5 | 0.5 | 0.5 | 0.5 |

The details of the structure of each compound in Tables were as follows.

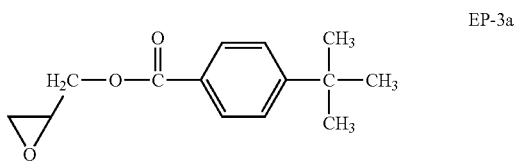
EP-3a

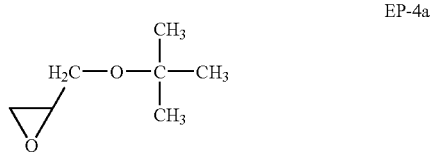
EP-4a

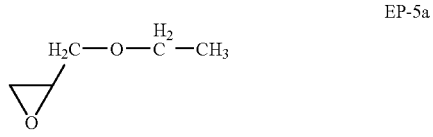
EP-5a

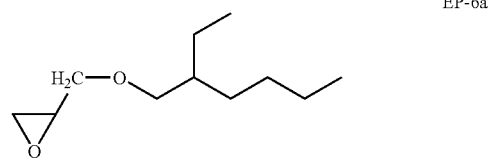
EP-6a

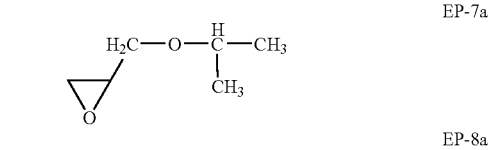
EP-7a

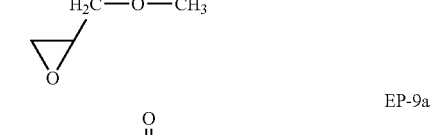
EP-8a

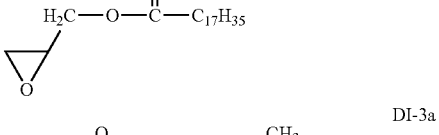
EP-9a

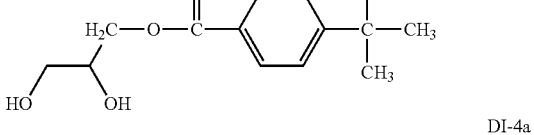
DI-3a

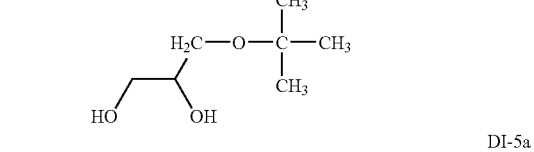
DI-4a

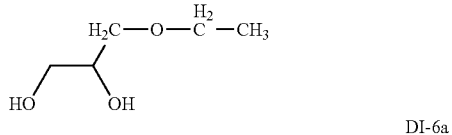
DI-5a

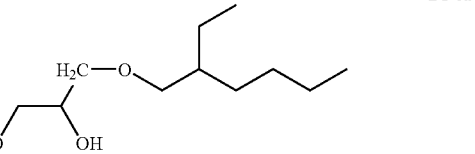
DI-6a

-continued

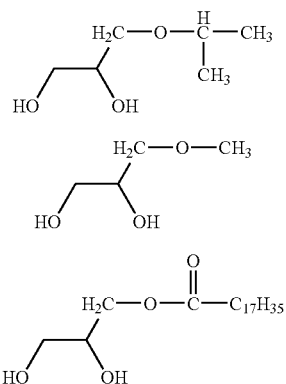

DI-7a

DI-8a

DI-9a

K: dark black ink
C: dark cyan ink
M: dark magenta ink
Y: dark yellow ink
LC: light cyan ink
LM: light magenta ink.

Ink-jet Image Forming Method

To the ink-jet recording apparatus comprised of the compositions as described in FIG. 1, which is provided with piezo type ink-jet nozzles, each of Ink Composition Sets 1a-4a prepared as above was loaded, and the following image recording was continuously conducted onto the recording material of a web roll of 600 mm width and 500 m length, described in Table 11a. The ink supply system consisted of an ink tank, a supply pipe, an anterior chamber ink tank immediately preceding a head, piping provided with a filter, and a piezo head. The portion from the anterior chamber to the head was thermally insulated and heated to 50° C. The piezo head was driven to eject multi-sized dots of 2-20 µl at resolution of 720×720 dpi, and each of inks was continuously ejected. After deposition of each ink, ultraviolet radiation, from lamp units provided on both sides of the carriage, was instantaneously conducted (being less than 0.5 seconds after ink deposition). After image recording, the total ink layer thickness was measured, and the thickness was within the range of 2.3-13 µm. Herein, "dpi" in this invention is dots per inch (being 2.54 cm). Formation of the ink-jet image was conducted under the conditions of 25° C. and 30% RH.

Further, images were formed in the same manner as above, except that using a line head method ink-jet recording apparatus described in FIG. 2, and using Ink Composition Sets 5a-8a.

The details of the recording materials described in Table 11a, listed by abbreviated names, were as follows.

OPP: oriented polypropylene
PET: polyethylene terephthalate
PVC: polyvinyl chloride TABLE 11a

| Sample No. | Ink | Recording material | Radiation light source | Radiation timing | Radiation method (area) | Illuminance at 254 nm (measured by using UVPF-A1, manufactured by Iwasaki Electric Co., Ltd.) Illuminance on surface of Recording material | Remarks |
|---|---|---|---|---|---|---|---|
| 1a | Ink Composition Set 1a | OPP | *1 | 0.2 sec. after deposition | *3 | *5 | Inv. |
| 2a | Ink Composition Set 1a | PET | *1 | 0.2 sec. after deposition | *3 | *5 | Inv. |
| 3a | Ink Composition Set 1a | PVC | *1 | 0.2 sec. after deposition | *3 | *5 | Inv. |
| 4a | Ink Composition Set 2a | OPP | *1 | 0.2 sec. after deposition | *3 | *5 | Inv. |
| 5a | Ink Composition Set 2a | PET | *1 | 0.2 sec. after deposition | *3 | *5 | Inv. |
| 6a | Ink Composition Set 2a | PVC | *1 | 0.2 sec. after deposition | *3 | *5 | Inv. |
| 7a | Ink Composition Set 3a | OPP | *1 | 0.2 sec. after deposition | *3 | *5 | Inv. |
| 8a | Ink Composition Set 3a | PET | *1 | 0.2 sec. after deposition | *3 | *5 | Inv. |
| 9a | Ink Composition Set 3a | PVC | *1 | 0.2 sec. after deposition | *3 | *5 | Inv. |
| 10a | Ink Composition Set 4a | OPP | *1 | 0.2 sec. after deposition | *3 | *5 | Comp. |
| 11a | Ink Composition Set 4a | PET | *1 | 0.2 sec. after deposition | *3 | *5 | Comp. |
| 12a | Ink Composition Set 4a | PVC | *1 | 0.2 sec. after deposition | *3 | *5 | Comp. |
| 13a | Ink Composition Set 5a | OPP | *2 | 0.1 sec. after deposition | *4 | *6 | Inv. |
| 14a | Ink Composition Set 5a | PET | *2 | 0.1 sec. after deposition | *4 | *6 | Inv. |
| 15a | Ink Composition Set 5a | PVC | *2 | 0.1 sec. after deposition | *4 | *6 | Inv. |
| 16a | Ink Composition Set 6a | OPP | *2 | 0.1 sec. after deposition | *4 | *6 | Inv. |
| 17a | Ink Composition Set 6a | PET | *2 | 0.1 sec. after deposition | *4 | *6 | Inv. |
| 18a | Ink Composition Set 6a | PVC | *2 | 0.1 sec. after deposition | *4 | *6 | Inv. |
| 19a | Ink Composition Set 7a | OPP | *2 | 0.1 sec. after deposition | *4 | *6 | Inv. |
| 20a | Ink Composition Set 7a | PET | *2 | 0.1 sec. after deposition | *4 | *6 | Inv. |
| 21a | Ink Composition Set 7a | PVC | *2 | 0.1 sec. after deposition | *4 | *6 | Inv. |

TABLE 11a-continued

| Sample No. | Ink | Recording material | Radiation conditions | | | Illuminance at 254 nm (measured by using UVPF-A1, manufactured by Iwasaki Electric Co., Ltd.) Illuminance on surface of Recording material | Remarks |
|---|---|---|---|---|---|---|---|
| | | | Radiation light source | Radiation timing | Radiation method (area) | | |
| 22a | Ink Composition Set 8a | OPP | *2 | 0.1 sec. after deposition | *4 | *6 | Comp. |
| 23a | Ink Composition Set 8a | PET | *2 | 0.1 sec. after deposition | *4 | *6 | Comp. |
| 24a | Ink Composition Set 8a | PVC | *2 | 0.1 sec. after deposition | *4 | *6 | Comp. |

*1: high pressure mercury vapor lamp Vzero 085 (manufactured by Integration Technology, Ltd.)
*2: low pressure mercury vapor lamp (manufactured by Iwasaki Electric Co., Ltd.)
*3: Recording head = both sides of recording head (ref. FIG. 1)
*4: Recording head = linear light source at downstream of the conveyance direction of the recording material (ref. FIG. 2)
*5: 400 mW/cm
*6: 50 mW/cm Evaluation of Ink-jet Recorded Image Images prepared with above image forming method were evaluated based on he following criteria.

Color Mixing

Dots of each color of Y, M, C and K were printed so as to be adjacent, and each color dot next to other color dots was visually observed under magnification using a loupe to evaluate color mixing, being bleeding, based on the following criteria.

A: Adjacent dots maintained perfect circularity, and no bleeding was observed.
B: Adjacent dots maintained nearly perfect circularity, and only slight bleeding was observed.
C: Adjacent dots bled slightly with noticeable loss of circularity.
D: Adjacent dots bled and obviously mixed with each other.

The evaluation results of the above tests are shown in Table 12a.

TABLE 12a

| Sample No. | Color mixing (bleeding, wrinkle) at 25° C., 30% RH | Remarks |
|---|---|---|
| 1a | A | Inv. |
| 2a | A | Inv. |
| 3a | A | Inv. |
| 4a | B | Inv. |
| 5a | B | Inv. |
| 6a | B | Inv. |
| 7a | B | Inv. |
| 8a | B | Inv. |
| 9a | B | Inv. |
| 10a | D | Comp. |
| 11a | D | Comp. |
| 12a | D | Comp. |
| 13a | A | Inv. |
| 14a | A | Inv. |
| 15a | A | Inv. |
| 16a | B | Inv. |
| 17a | B | Inv. |
| 18a | B | Inv. |
| 19a | B | Inv. |
| 20a | B | Inv. |
| 21a | B | Inv. |
| 22a | D | Comp. |

TABLE 12a-continued

| Sample No. | Color mixing (bleeding, wrinkle) at 25° C., 30% RH | Remarks |
|---|---|---|
| 23a | D | Comp. |
| 24a | D | Comp. |

As is apparent from Table 12a, it was proven that the image forming method of this invention could record a high-definition image without color mixing (being bleeding), compared to the comparative samples.

What is claimed is:

1. An active ray curable ink-jet composition comprising:
   (i) a colorant; and
   (ii) a set of (I) or a set of (II),
   wherein the set of (I) contains:
      (a) at least one photopolymerizable compound represented by Formula (1):

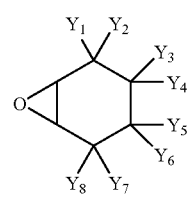

Formula (1)

wherein $Y_1$ - $Y_8$ are chosen from a hydrogen atom, an alkyl group, a carbonyl group, an ether group, an alkenyl group, an oxiranyl group, a functional group having an alkyl alkanoate group and an alicyclic epoxy group, or a functional group having a carboxylate group and an alicyclic epoxy group; and (b) a diol compound represented by Formula (2), which is present in the composition in an amount ranging from 0.1 to 10% by weight, relative to the total weight of the active ray curable ink composition:

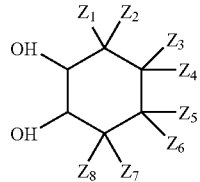

Formula (2)

wherein $Z_1$-$Z_8$ are chosen from a hydrogen atom, an alkyl group, a carbonyl group, an ether group, an alkenyl group, an oxiranyl group, an alkyldiol group, a functional group having an alkyl alkanoate group and an alicyclic epoxy group, a functional group having an alkyl alkanoate group and an alicyclic diol group, a functional group having a carboxylate group and an alicyclic diol group, or a functional group having a carboxylate group and an alicyclic epoxy group; and the set of (II) contains:
(a) a photopolymerizable oxetane compound;
(b) a photopolymerizable compound represented by Formula (1a):

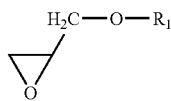

Formula (1a)

wherein $R_1$ is chosen from an alkyl group having 1-10 carbon atoms, an aromatic group, or an acyl group; and
(c) a diol compound represented by Formula (2a), which is present in the composition in an amount ranging from 0.1 to 10% by weight, relative to the total weight of the active ray curable ink-jet composition:

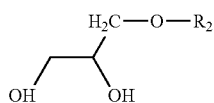

Formula (2a)

wherein $R_2$ is chosen from an alkyl group having from 1 to 10 carbon atoms, an aromatic group, or an acyl group.

2. The active ray curable ink-jet composition according to claim 1, wherein the diol compound represented by Formula (2a) is a compound obtained by chain opening of the photopolymerizable compound represented by Formula 1(a).

3. The active ray curable ink-jet composition according to claim 1, wherein the diol compound represented by Formula (2) is a compound obtained by chain opening of the photopolymerizable compound represented by Formula (1).

4. The active ray curable ink-jet composition according to claim 1, wherein the photopolymerizable compound is α-pinene oxide; and a diol compound is obtained by chain opening of an epoxy group of α-pinene oxide, wherein the diol compound is present in an amount ranging from 0.1 to 10% by weight, relative to the total weight of the active ray curable ink-jet composition.

5. The active ray curable ink-jet composition according to claim 1, wherein the photopolymerizable compound is 1,2: 8,9 diepoxy limonene; and a diol compound is obtained by chain opening of the epoxy group of 1,2: 8,9 diepoxy limonene, wherein the diol compound is present in an amount ranging from 0.1 to 10% by weight, relative to the total weight of the active ray curable ink-jet composition.

6. The active ray curable ink-jet composition according to claim 1, wherein the set of (I) further contains a photopolymerizable oxetane compound.

7. The active ray curable ink-jet composition according to claim 1, wherein the colorant is a pigment.

8. The active ray curable ink-jet composition according to claim 1, wherein the colorant is an oil soluble dye.

9. The active ray curable ink-jet composition according to claim 1, wherein a viscosity of the ink composition at 25° C. is 7-50 mPa·s.

10. The active ray curable ink-jet composition of claim 1, wherein the alkyl group is a methyl group, an ethyl group, a propyl group, a butyl group, an isopropyl group, a t-butyl group, a hexyl group, a 2-ethylhexyl group, or a benzyl group.

11. The active ray curable ink-jet composition of claim 1, wherein the carbonyl group is an acetyl group or a benzoyl group.

12. The active ray curable ink-jet composition of claim 1, wherein the ether group is an alkyl ether group or an aryl ether group.

13. The active ray curable ink-jet composition of claim 1, wherein the aromatic group is a phenyl group or a naphthyl group.

14. The active ray curable ink-jet composition of claim 1, wherein the acyl group is a benzoyl group, a methacryl group, or a stearyl group.

15. An ink set comprising a plurality of the active ray curable ink-jet ink compositions according to claim 7, wherein each of the ink compositions contains at least one pigment selected from the group consisting of yellow pigments, magenta pigments, cyan pigments, and black pigments.

16. An ink set comprising a plurality of the active ray curable ink-jet ink compositions according to claim 8, wherein each of the active ray curable ink-jet ink compositions contains at least one dye selected from the group consisting of oil soluble yellow dyes, oil soluble magenta dyes, oil soluble cyan dyes, and oil soluble black dyes.

17. An ink-jet ink set comprising a plurality of the active ray curable ink-jet ink compositions according to claim 9, wherein each of the active ray curable ink-jet ink compositions has a viscosity of 7-50 mPa·s.

18. An image forming method using the ink-jet ink composition of claim 1, comprising the steps of:
(a) ejecting a droplet of the ink composition from a nozzle of an ink-jet recording head to form an image onto a recording material; and (b) irradiating the image with an active ray,
wherein the irradiation step is carried out between 0.001 and 1.0 second after deposition of the droplet of the ink composition.

19. The image forming method according to claim 18, wherein after irradiation step, a total thickness of the ink compositions on the recording material is 2-25 µm.

20. The image forming method according to claim 18, wherein a volume of the droplet of the ink composition ejected from the nozzle is 2-20 pl.

21. The image forming method according to claim 18, wherein the ink-jet recording head is a line head method ink-jet recording head.

* * * * *